(12) United States Patent
Duerig et al.

(10) Patent No.: US 8,102,753 B2
(45) Date of Patent: Jan. 24, 2012

(54) METHOD FOR FORMING DEFORMED REGIONS IN A RESIN LAYER

(75) Inventors: Urs T. Duerig, Rueschlikon (CH); Jane Elizabeth Frommer, San Jose, CA (US); Bernd Walter Gotsmann, Horgen (CH); Erik Christopher Hagberg, Evansville, IN (US); James Lupton Hedrick, Pleasanton, CA (US); Armin W. Knoll, Zurich (CH); Victor Yee-Way Lee, San Jose, CA (US); Teddie Peregrino Magbitang, San Jose, CA (US); Robert Dennis Miller, San Jose, CA (US); Russell Clayton Pratt, Los Gatos, CA (US); Charles Gordon Wade, Los Gatos, CA (US); Johannes Windeln, Bodenheim (DE)

(73) Assignee: International Business Machines Corporation, Armonk, NY (US)

( * ) Notice: Subject to any disclaimer, the term of this patent is extended or adjusted under 35 U.S.C. 154(b) by 1739 days.

(21) Appl. No.: 11/358,774

(22) Filed: Feb. 21, 2006

(65) Prior Publication Data

US 2007/0196645 A1   Aug. 23, 2007

(51) Int. Cl.
*G11B 3/00* (2006.01)
(52) U.S. Cl. .................................. 369/154; 369/127
(58) Field of Classification Search .................. None
See application file for complete search history.

(56) References Cited

U.S. PATENT DOCUMENTS

| | | | |
|---|---|---|---|
| 4,038,320 A | 7/1977 | Arnold et al. | |
| 4,276,407 A | 6/1981 | Bilow et al. | |
| 5,412,066 A | 5/1995 | Hergenrother et al. | |
| 5,567,800 A | 10/1996 | Hergenrother et al. | |
| 5,606,014 A | 2/1997 | Connell et al. | |
| 5,681,967 A | 10/1997 | Hergenrother et al. | |
| 5,714,566 A | 2/1998 | Lubowtiz et al. | |
| 5,760,168 A | 6/1998 | Hergenrother et al. | |
| 6,124,035 A | 9/2000 | Connell et al. | |
| 6,136,949 A | 10/2000 | Earls et al. | |
| 6,288,188 B1 | 9/2001 | Godschalx et al. | |
| 6,333,391 B1 | 12/2001 | Laycock et al. | |
| 6,344,523 B1 | 2/2002 | Hawthorne et al. | |
| 6,346,296 B1 | 2/2002 | McCarthy et al. | |
| 6,350,817 B1 | 2/2002 | Connell et al. | |
| 6,441,099 B1 | 8/2002 | Connell et al. | |

(Continued)

FOREIGN PATENT DOCUMENTS

EP    05404018.2    1/2005

OTHER PUBLICATIONS

Vettiger et al.; The "Millipede"—Nanotechnology Entering Data Storage; IEEE Transactions on Nanotechnology, vol. 1, No. 1; Mar. 2002; pp. 39-55.

(Continued)

*Primary Examiner* — Paul Huber
(74) *Attorney, Agent, or Firm* — Schmeiser, Olsen & Watts

(57) ABSTRACT

An approach is presented for designing a polymeric layer for nanometer scale thermo-mechanical storage devices. Cross-linked polyimide oligomers are used as the recording layers in atomic force data storage device, giving significantly improved performance when compared to previously reported cross-linked and linear polymers. The cross-linking of the polyimide oligomers may be tuned to match thermal and force parameters required in read-write-erase cycles. Additionally, the cross-linked polyimide oligomers are suitable for use in nano-scale imaging.

21 Claims, 11 Drawing Sheets

U.S. PATENT DOCUMENTS

| | | |
|---|---|---|
| 2003/0114598 A1 | 6/2003 | Li et al. |
| 2003/0215654 A1 | 11/2003 | Moriyama et al. |
| 2004/0046155 A1 | 3/2004 | Li et al. |
| 2004/0198850 A1 | 10/2004 | Connor et al. |
| 2005/0047307 A1 | 3/2005 | Frommer et al. |
| 2005/0050258 A1 | 3/2005 | Frommer et al. |
| 2009/0100553 A1* | 4/2009 | Despont et al. .................. 850/33 |

OTHER PUBLICATIONS

Vettiger, et al.; The Millipede—More than one thousand tips for future AFM data storage; IBM Journal of Research and Development, vol. 44 No. 3; May 2000.

Office Action (Mail Date Jun. 9, 2009) for U.S. Appl. No. 11/626,431, filed Jan. 24, 2007; Confirmation No. 1191.

* cited by examiner

METHOD FOR FORMING DEFORMED REGIONS IN A RESIN LAYER

FIELD OF THE INVENTION

The present invention relates to the field of high density data storage and imaging and more specifically to a data storage and image medium, a data storage and imaging system, and a data storage and imaging method.

BACKGROUND OF THE INVENTION

Current data storage and imaging methodologies operate in the micron regime. In an effort to store ever more information in ever smaller spaces, data storage density has been increasing. In an effort to reduce power consumption and increase the speed of operation of integrated circuits, the lithography used to fabricate integrated circuits is pressed toward smaller dimensions and more dense imaging. As data storage size increases and density increases and integrated circuit densities increase, there is a developing need for data storage and imaging methodologies that operate in the nanometer regime.

SUMMARY OF THE INVENTION

A first aspect of the present invention is a method, comprising: pushing a probe, heated to at least 100° C., into a cross-linked resin layer formed by curing a layer of polyimide oligomers; and removing the probe from the resin layer, resulting in formation of a deformed region in the resin layer.

A second aspect of the present invention is the first aspect wherein the polyimide oligomers have the structure:

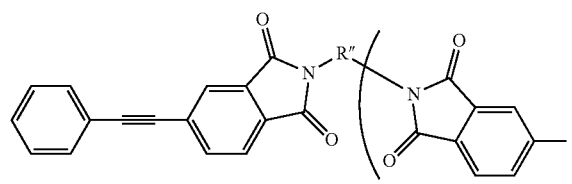

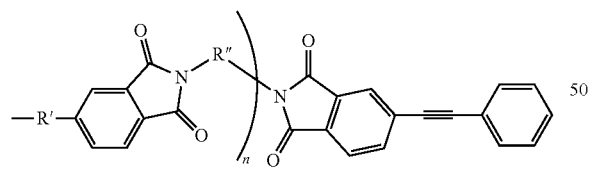

wherein R' is selected from the group consisting of

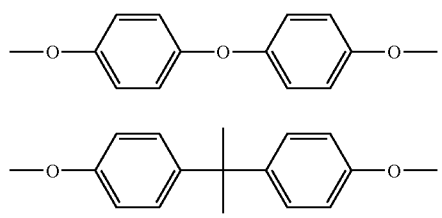

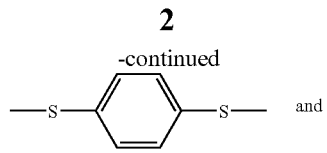

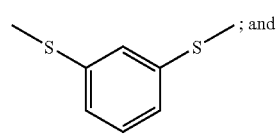

wherein R" is selected from the group consisting of

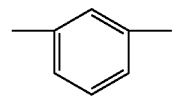

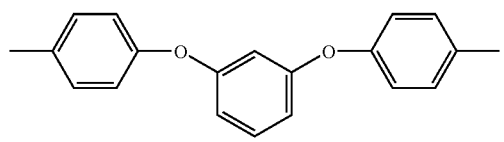

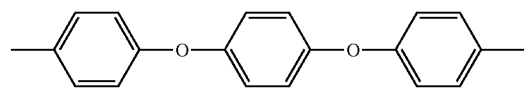

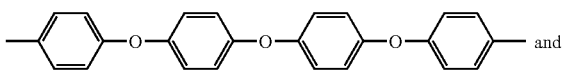

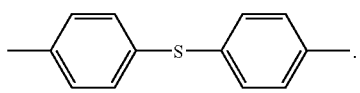

A third aspect of the present invention is the second aspect, wherein the layer of polyimide oligomers includes a reactive diluent, the reactive diluent selected from the group consisting of:

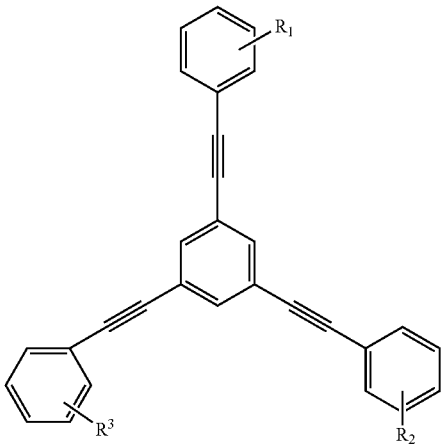

where $R_1$, $R_2$ and $R_3$ are each independently selected from the group consisting of hydrogen, alkyl groups, aryl groups, cycloalkyl groups, alkoxy groups, aryloxy groups, alkylamino groups, arylamino groups, alkylarylamino groups, arylthio, alkylthio groups and

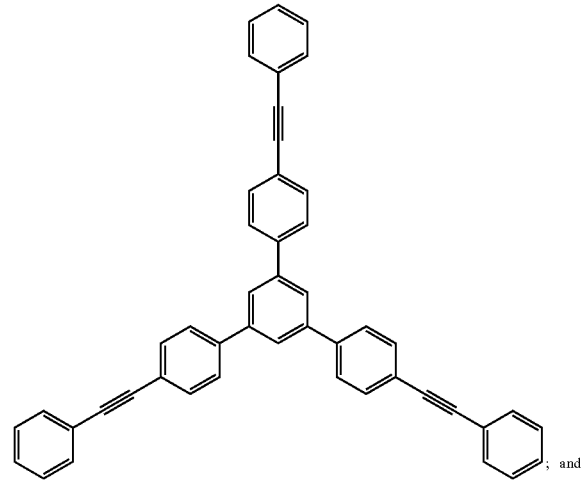
; and wherein the polyimide oligomers are cross-linked by reactive diluent groups derived from the reactive diluent during the curing.

A fourth aspect of the present invention is the third aspect wherein a glass transition temperature of the resin layer with the reactive diluent groups is within about 50° C. of a glass transition temperature of an otherwise identical resin layer formed without the reactive diluent groups.

A fifth aspect of the present invention is the first aspect wherein the polyimide oligomers have the structure:

wherein R' is selected from the group consisting of

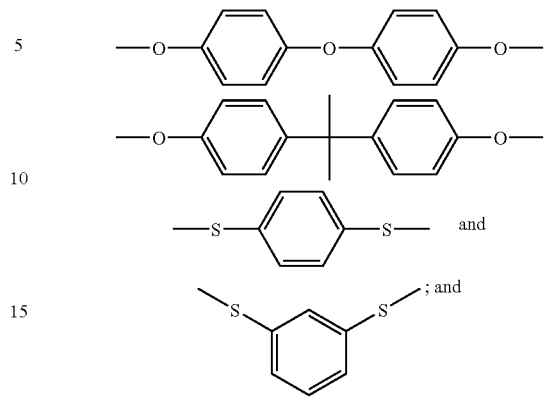

where R" is selected from the group consisting of

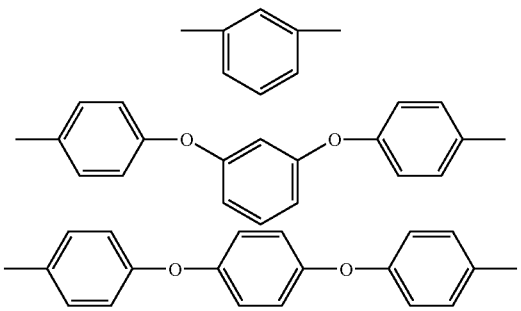

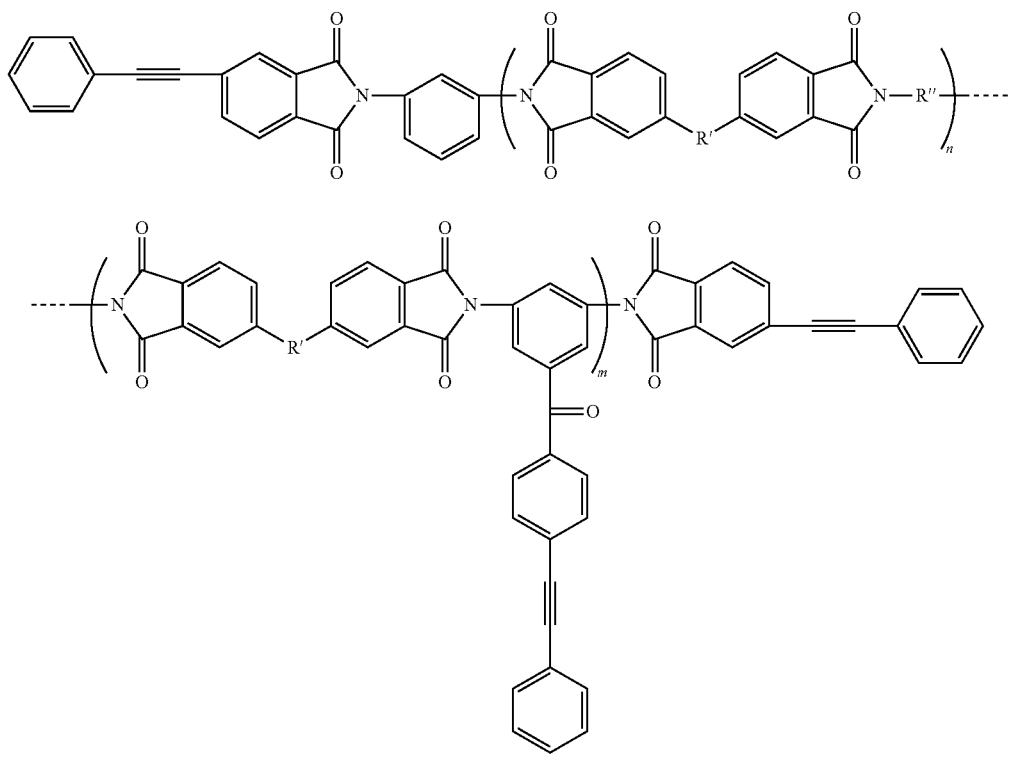

-continued

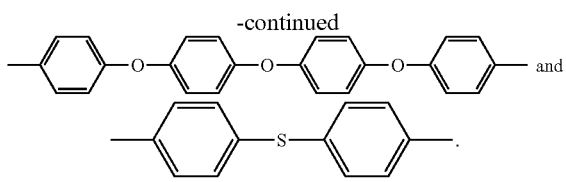

and.

A sixth aspect of the present invention is the first aspect wherein after the curing, the resin layer is cross-linked by reactive endgroups of the polyimide oligomers.

A seventh aspect of the present invention is the first aspect wherein after the curing, the resin layer is cross-linked by reactive pendent groups attached to a backbone of the polyimide oligomers.

An eighth aspect of the present invention is the first aspect wherein a glass transition temperature of the resin layer is less than about 250° C.

A ninth aspect of the present invention is the first aspect wherein a modulus of the resin layer above a glass transition temperature of the resin layer is between about 1.5 and about 3.0 decades lower than a modulus of the resin layer below the glass transition temperature of the resin layer.

A tenth aspect of the present invention is the first aspect wherein the resin layer is thermally and oxidatively stable to at least 400° C.

An eleventh aspect of the present invention is the first aspect further including: removing the resin layer in the deformed region to form an exposed region of a substrate and a region of substrate protected by the resin layer; and modifying at least a portion of the exposed region of substrate.

A twelfth aspect of the present invention is the first aspect further including: dragging the probe in a direction parallel to a top surface of the resin layer while heating and pushing the probe, resulting in formation of a trough in the resin layer.

A thirteenth aspect of the present invention is the first aspect wherein the cross-linked resin layer has a thickness between about 10 nm and about 500 nm and a thickness variation of less than about 1.0 nm across the cross-linked resin layer.

A fourteenth aspect of the present invention is a method, comprising: bringing a thermal-mechanical probe into proximity with a resin layer multiple times to induce deformed regions at points in the resin layer, the resin layer comprising cross-linked polyimide oligomers, the thermal mechanical probe heating the points in the resin layer above about 100° C. and thereby writing information in the resin layer.

A fifteenth aspect of the present invention is a data storage device, comprising: a recording medium comprising a resin layer overlying a substrate, in which topographical states of the resin layer represent data, the resin layer comprising cross-linked polyimide oligomers; and a read-write head having one or more thermo-mechanical probes, each of the thermo-mechanical probes including a resistive region locally exerting heat at a tip of the thermo-mechanical probe in response to electrical current being applied to the one or more thermo-mechanical probe; and a scanning system for scanning the read-write head across a surface of the recording medium.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

For the purposes of describing the present invention, on a scale of 0-100 units, a decade is 10 units. On a scale of 0-1000, a decade is 100 units. Therefore a decade of a range is defined as one-tenth of a range of units from 0 units to $10^n$ units, wherein n is a whole positive integer equal to or greater than 0.

Figure 1A:
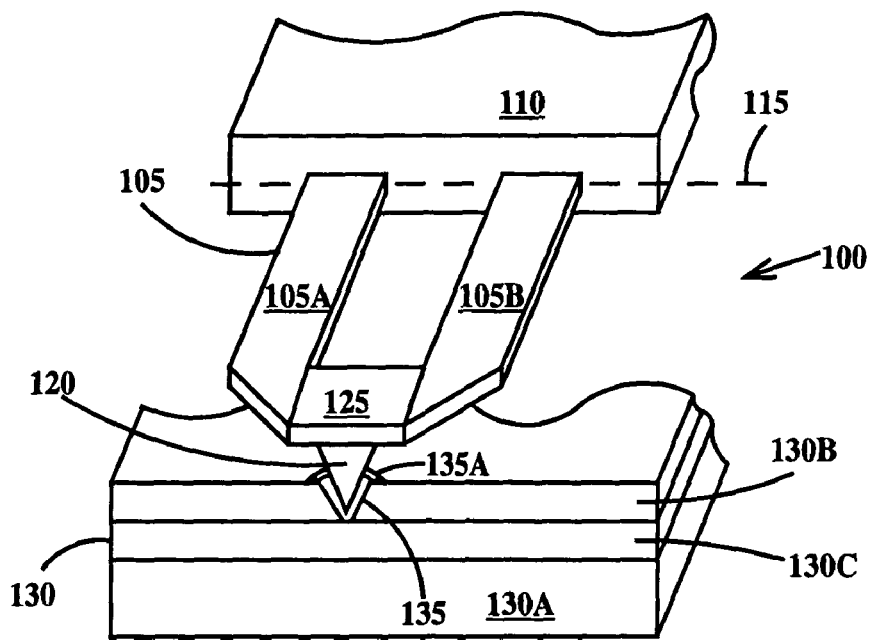
FIGS. 1A through 1C illustrate the structure and operation of a tip assembly for a data storage device including the data storage medium according to the embodiments of the present invention.
Figure 1B:
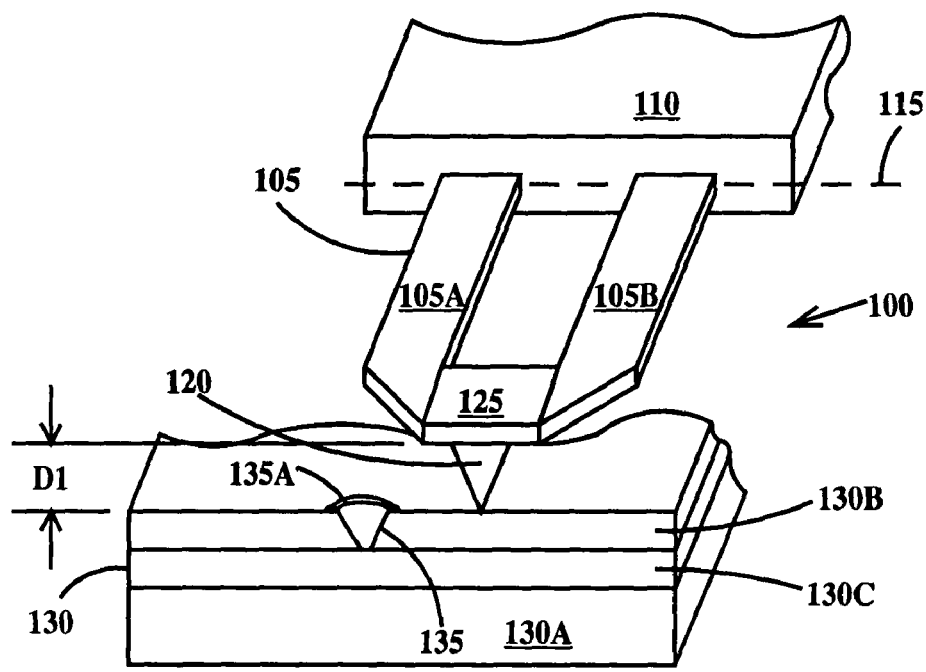
Figure 1C:
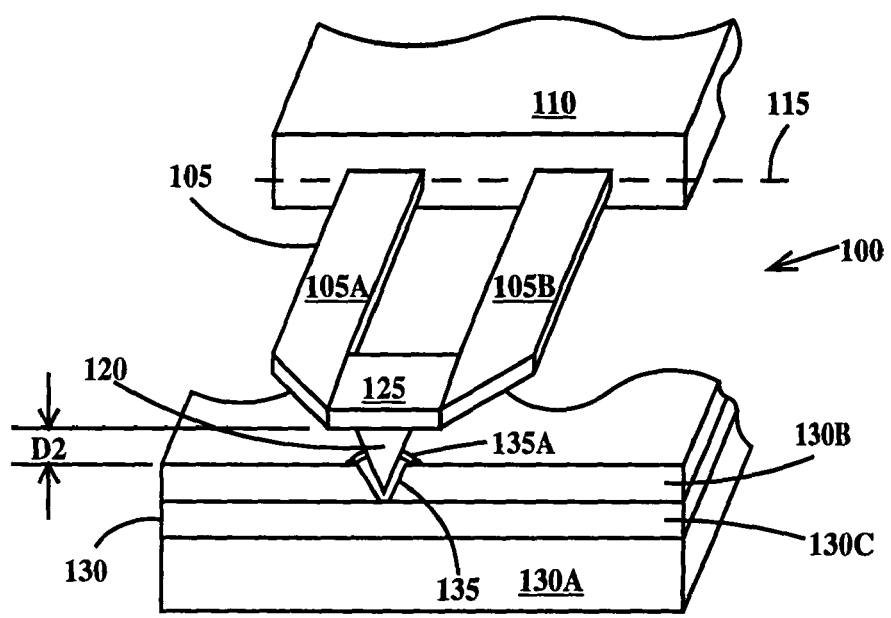

FIGS. 1A through 1C illustrate the structure and operation of a tip assembly 100 for a data storage device including the data storage medium according to the embodiments of the present invention. In FIG. 1A, probe tip assembly 100 includes a U-shaped cantilever 105 having flexible members 105A and 105B connected to a support structure 110. Flexing of members 105A and 105B provides for substantial pivotal motion of cantilever 105 about a pivot axis 115. Cantilever 105 includes a tip 120 fixed to a heater 125 connected between flexing members 105A and 105B. Flexing members 105A and 105B and heater 125 are electrically conductive and connected to wires (not shown) in support structure 110. In one example, flexing members 105A and 105B and tip 120 are formed of highly-doped silicon and have a low electrical resistance, and heater 125 is formed of lightly doped silicon having a high electrical resistance sufficient to heat tip 120, in one example, between about 100° C. and about 400° C. when current is passed through heater 125. The electrical resistance of heater 125 is a function of temperature.

Also illustrated in FIG. 1A is a storage medium (or a recording medium) 130 comprising a substrate 130A, and a cured polyimide resin layer 130B. In one example, substrate 130A comprises silicon. Cured polyimide resin layer 130B may be formed by solution coating, spin coating, dip coating or meniscus coating uncured polyimide resin formulations and performing a curing operation on the resultant coating. In one example, cured polyimide resin layer 130B has a thickness between about 10 nm and about 500 nm and a variation in thickness of less than about 1.0 nm across the cured polyimide resin layer. The composition of cured polyimide resin layer 130B is described infra. An optional penetration stop layer 130C is shown between cured polyimide resin layer 130B and substrate 130A. Penetration stop layer 130C limits the depth of penetration of tip 120 into cured polyimide resin layer 130B.

Turning to the operation of tip assembly 100, in FIG. 1A, an indentation 135 is formed in cured polyimide resin layer 130B by heating tip 120 to a writing temperature $T_W$ by passing a current through cantilever 105 and pressing tip 120 into cured polyimide resin layer 130B. Heating tip 120 allows the tip to penetrate the cured polyimide resin layer 130B forming indentation 135, which remains after the tip is removed. In one example, the cured polyimide resin layer 130B is heated to above 200° C. by heated tip 120 to form indentation 135. As indentations 135 are formed, a ring 135A of cured polyimide polymer is formed around the indentation. Indentation 135 represents a data bit value of "1", a data bit value of "0" being represented by an absence of an indentation.

FIGS. 1B and 1C illustrate reading the bit value. In FIGS. 1B and 1C, tip assembly 100 is scanned across a portion of cured polyimide resin layer 130B. When tip 120 is over a region of cured polyimide resin layer 130B not containing an indentation, heater 125 is a distance D1 from the surface of the cured polyimide resin layer (see FIG. 1B). When tip 120 is over a region of cured polyimide resin layer 130B containing an indentation, heater 125 is a distance D2 from the surface of the cured polyimide resin layer (see FIG. 1C) because the tip "falls" into the indentation. D1 is greater than D2. If heater 125 is at a temperature $T_R$ (read temperature), which is lower than $T_W$ (write temperature), there is more heat loss to substrate 130A when tip 120 is in an indentation than when the tip is not. This can be measured as a change in resistance of the heater at constant current, thus "reading" the data bit value. It is advantageous to use a separate heater for reading which is mechanically coupled to the tip but thermally isolated from the tip. A typical embodiment is disclosed in Patent Application EP 05405018.2, 13 Jan. 2005.

"Erasing" (not shown) is accomplished by positioning tip 120 in close proximity to indentation 135, heating the tip to a temperature $T_E$ (erase temperature), and applying a loading force similar to writing, which causes the previously written indent to relax to a flat state whereas a new indent is written slightly displaced with respect to the erased indent. The cycle is repeated as needed for erasing a stream of bits whereby an indent always remains at the end of the erase track. $T_E$ is typically greater than $T_W$. The erase pitch is typically on the order of the rim radius. In one example, the cured polyimide resin layer 130B is heated to above about 200° C. by heated tip 120, and the erase pitch is 10 nm to eliminate indentation 135.

Figure 2:
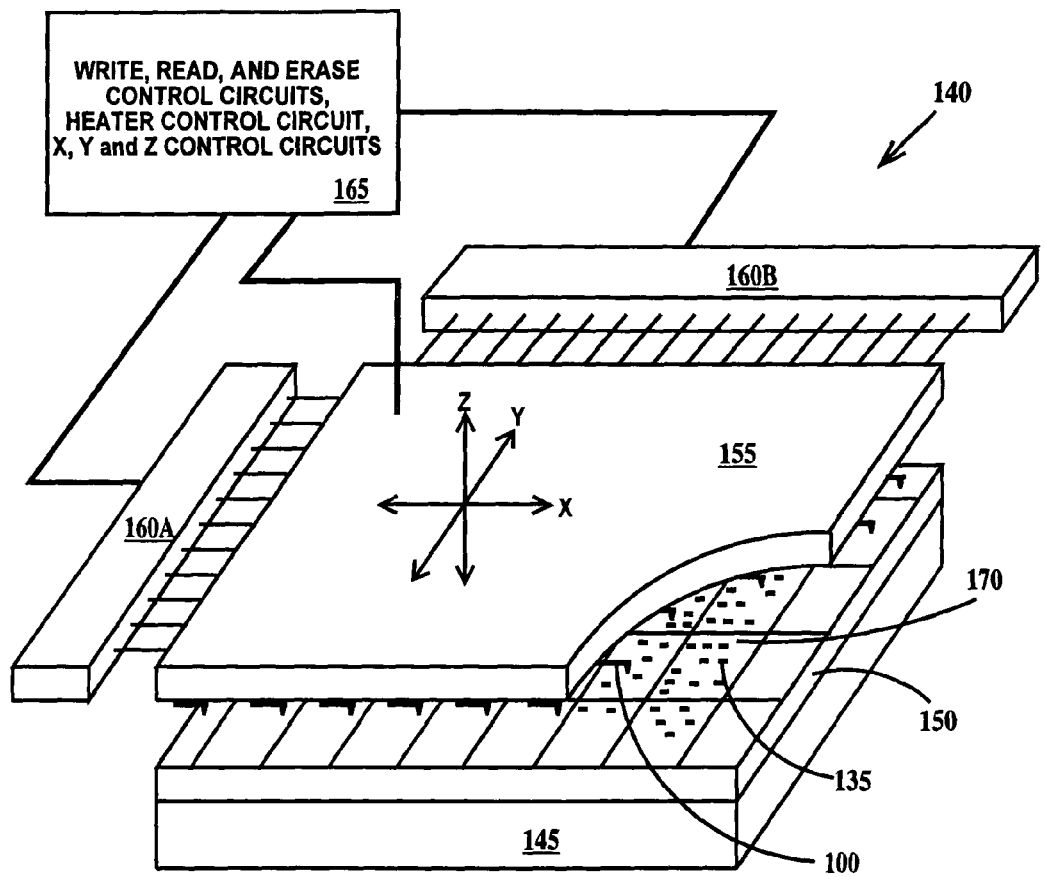
FIG. 2 is an isometric view of a local probe storage array including data storage medium according to the embodiments of the present invention.

FIG. 2 is an isometric view of a local probe storage array 140 including data storage medium according to the embodiments of the present invention. In FIG. 2, local probe storage array 140 includes substrate 145 having a cured polyimide resin layer 150 (similar to cured polyimide resin layer 130B of FIGS. 1A, 1B and 1C), which acts as the data-recording layer. An optional tip penetration stop layer may be formed between cured polyimide resin layer 150 and substrate 145. In one example, substrate 145 comprises silicon. Cured polyimide resin layer 150 may be formed by solution coating, spin coating, dip coating or meniscus coating uncured polyimide resin formulations and performing a curing operation on the resultant coating. In one example, cured polyimide resin layer 150 has a thickness between about 10 nm and about 500 nm and a variation in thickness across a writeable region of cured polyimide resin layer 150 of less than about 1.0 nm across the cured polyimide resin layer. The composition of cured polyimide resin layer 150 is described infra. Positioned over cured polyimide resin layer 150 is a probe assembly 155 including an array of probe tip assemblies 100 (described supra). Probe assembly 155 may be moved in the X, Y and Z directions relative to substrate 145 and cured polyimide resin layer 150 by any number of devices as is known in the art. Switching arrays 160A and 160B are connected to respective rows (X-direction) and columns (Y-direction) of probe tip assemblies 100 in order to allow addressing of individual probe tip assemblies. Switching arrays 160A and 160B are connected to a controller 165 which includes a write control circuit for independently writing data bits with each probe tip assembly 100, a read control circuit for independently reading data bits with each probe tip assembly 100, an erase control circuit for independently erasing data bits with each probe tip assembly 100, a heat control circuit for independently controlling each heater of each of the probe tip assembles 100, and X, Y and Z control circuits for controlling the X, Y and Z movement of probe assembly 155. The Z control circuit controls a contact mechanism (not shown) for contacting the cured polyimide resin layer 150 with the tips of the array of probe tip assemblies 100.

During a write operation, probe assembly 155 is brought into proximity to cured polyimide resin layer 150 and probe tip assemblies 100 are scanned relative to the cured polyimide resin layer. Local indentations 135 are formed as described supra. Each of the probe tip assemblies 100 writes only in a corresponding region 170 of cured polyimide resin layer 150. This reduces the amount of travel and thus time required for writing data.

During a read operation, probe assembly 155 is brought into proximity to cured polyimide resin layer 150 and probe tip assemblies 100 are scanned relative to the cured polyimide resin layer. Local indentations 135 are detected as described supra. Each of the probe tip assemblies 100 reads only in a corresponding region 170 of cured polyimide resin layer 150. This reduces the amount of travel and thus the time required for reading data.

During an erase operation, probe assembly 155 is brought into proximity to cured polyimide resin layer 150, and probe tip assemblies 100 are scanned relative to the cured polyimide resin layer. Local indentations 135 are erased as described supra. Each of the probe tip assemblies 100 reads only in a corresponding region 170 of cured polyimide resin layer 150. This reduces the amount of travel and thus time required for erasing data.

Additional details relating to data storage devices described supra may be found in the articles "*The Millipede— More than one thousand tips for future AFM data storage*," P. Vettiger et al., *IBM Journal of Research and Development*. Vol. 44 No. 3, May 2000 and "*The Millipede—Nanotechnology Entering Data Storage*," P. Vettiger et al., IEEE Transaction on *Nanotechnology*, Vol. 1, No, 1, March 2002. See also United States Patent Publication 2005/0047307, Published Mar. 3, 2005 to Frommer et al. and United States Patent Publication 2005/0050258, Published Mar. 3, 2005 to Frommer et al., both of which are hereby included by reference in there entireties.

Figure 3A:
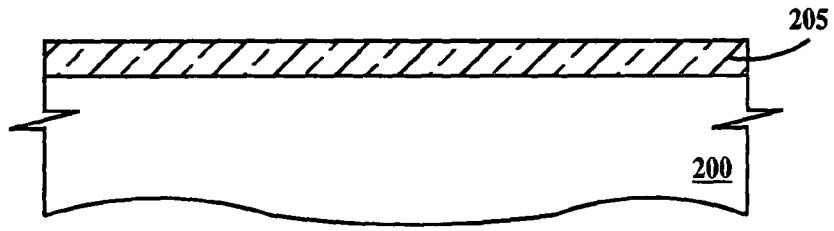
FIGS. 3A through 3D are cross-section views illustrating formation of a pattern in a substrate according to one embodiment of the present invention.

FIGS. 3A through 3D are cross-section views illustrating formation of a pattern in a substrate according to one embodiment of the present invention. In FIG. 3A, formed on a substrate 200 is a cured polyimide resin layer 205 (similar to cured polyimide resin layer 130B of FIGS. 1A, 1B and 1C and cured polyimide resin layer 150 of FIG. 2) which will be an imaging layer. Cured polyimide resin layer 205 may be formed by applying (by solution coating, spin coating, dip coating or meniscus coating) a layer of uncured polyimide oligomers (including reactive end capping agents and optional reactive diluents or reactive backbone linking agents as described infra) and then heating the substrate and uncured polyimide oligomers to a curing temperature causing cross-linking of the polyimide oligomers into a polyimide resin.

Figure 3B:
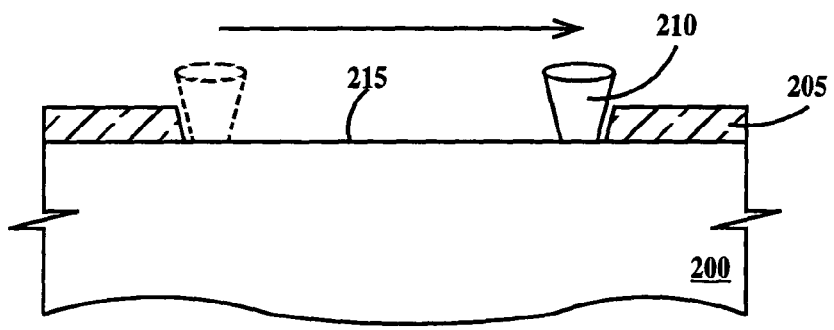

In FIG. 3B, a heated probe tip 210 is pushed down (perpendicular to a top surface 215 of substrate 200) into cured polyimide resin layer 205 and then dragged parallel to top surface 215 of substrate 200 thus exposing a region of substrate 200.

Figure 3C:
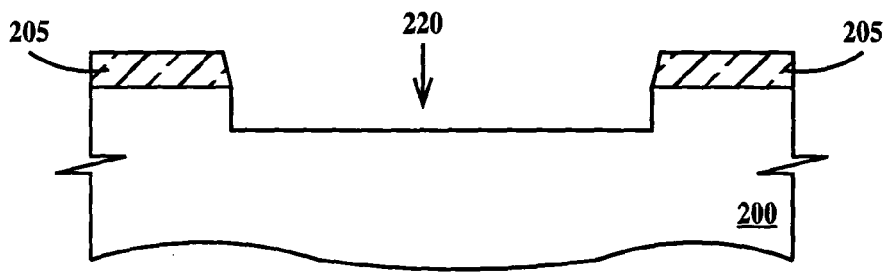
Figure 3D:
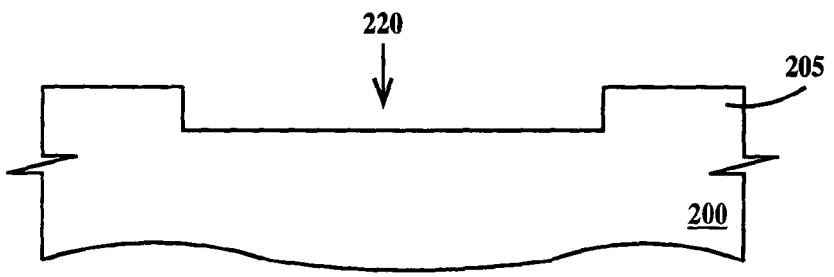

In FIG. 3C, a trench 220 is etched into substrate 200 wherever the substrate is not protected by cured polyimide resin layer 205. In FIG. 3D, cured polyimide resin layer 205 (see FIG. 3C) is removed.

Figure 4A:
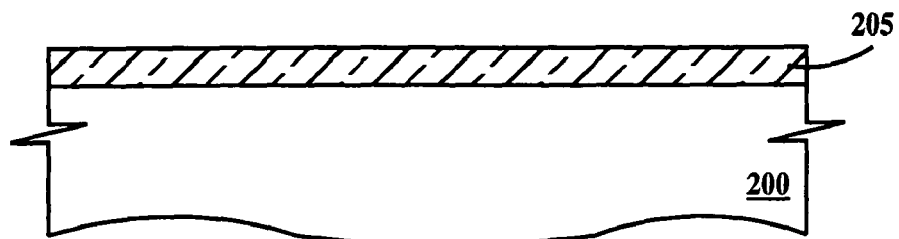
FIGS. 4A through 4E are cross-section views illustrating formation of a pattern in a substrate according to another embodiment of the present invention.
Figure 4B:
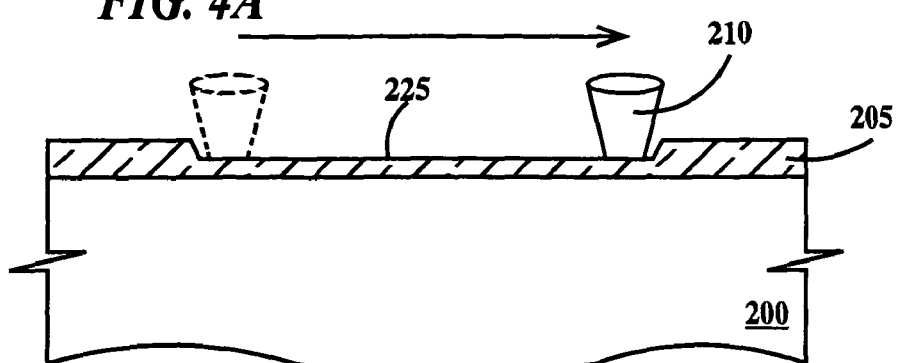
Figure 4C:
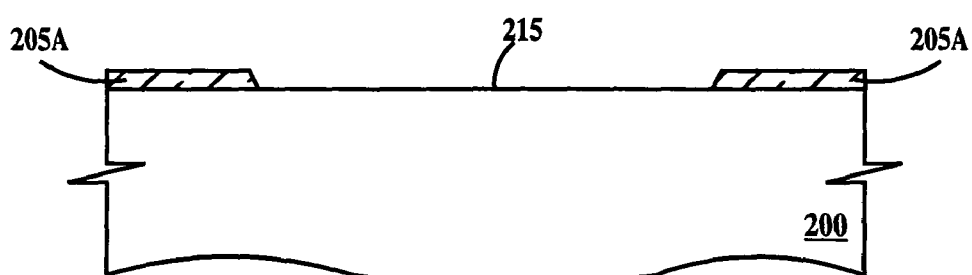

FIGS. 4A through 4E are cross-section views illustrating formation of a pattern in a substrate according to another embodiment of the present invention. FIGS. 4A and 4B are similar to FIGS. 3A and 3B except in FIG. 4B, heated probe 210 is not pressed completely through cured polyimide resin layer 205 forming a cured polyimide resin thinned region 225 in cured polyimide resin layer 205. In FIG. 4C, cured polyimide resin thinned region 225 (see FIG. 4B) is removed exposing top surface 215 of substrate 200 and also producing a thinned cured polyimide resin layer 205A. In one example, the removal of cured polyimide resin thinned region 225 is done by reactive plasma. In one example, the removal of cured polyimide resin thinned region 225 is done by controlled exposure to a liquid or a vapor.

Figure 4D:
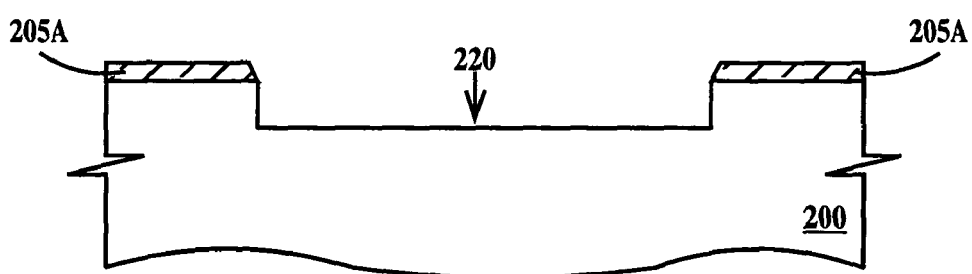
Figure 4E:
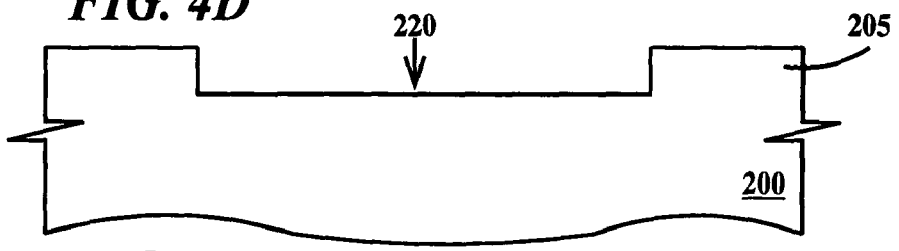

In FIG. 4D, trench 220 is etched into substrate 200 wherever the substrate is not protected by thinned cured polyimide resin layer 205A. In FIG. 4E, thinned cured polyimide resin layer 205A (see FIG. 4D) is removed.

Figure 5A:
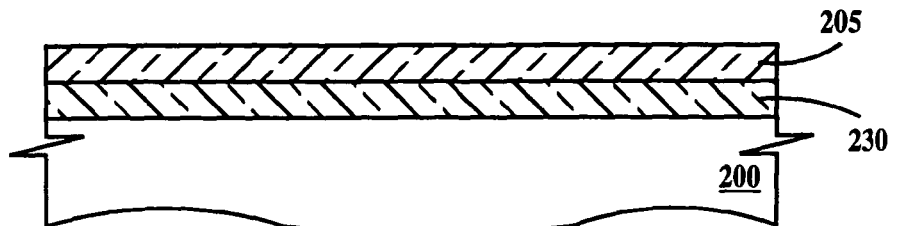
FIGS. 5A through 5E are cross-section views illustrating formation of a pattern in a layer on a substrate according to an embodiment of the present invention.
Figure 5B:
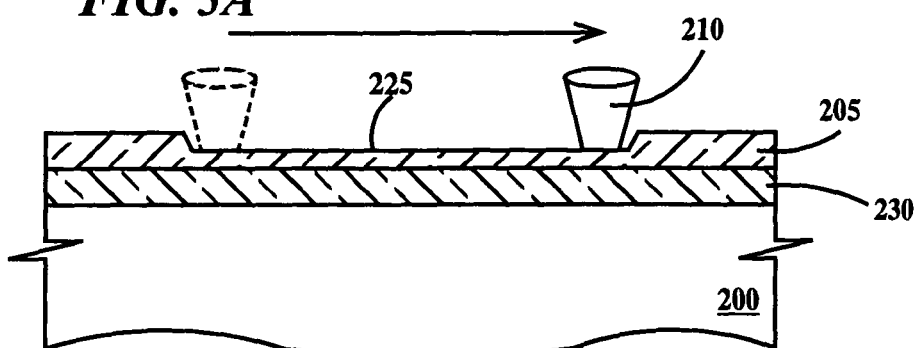
Figure 5C:
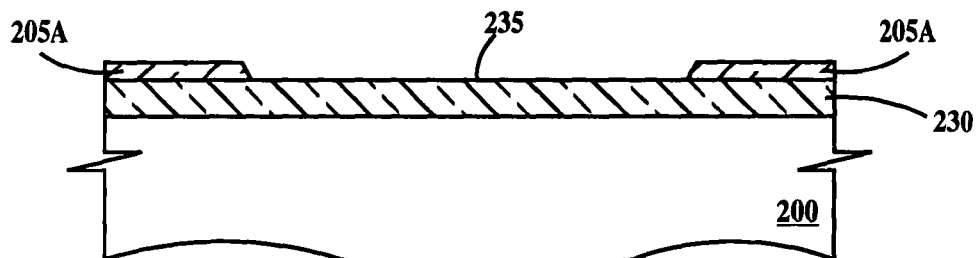

FIGS. 5A through 5E are cross-section views illustrating formation of a pattern in a layer on a substrate according to an embodiment of the present invention. FIGS. 5A and 5B are similar to FIGS. 4A and 4B except a hard mask layer 230 is formed between substrate 200 and cured polyimide resin layer 205. In FIG. 5C, cured polyimide resin thinned region 225 (see FIG. 5B) is removed exposing a top surface 235 of hard mask layer 225 and also producing a thinned cured polyimide resin layer 205A.

Figure 5D:
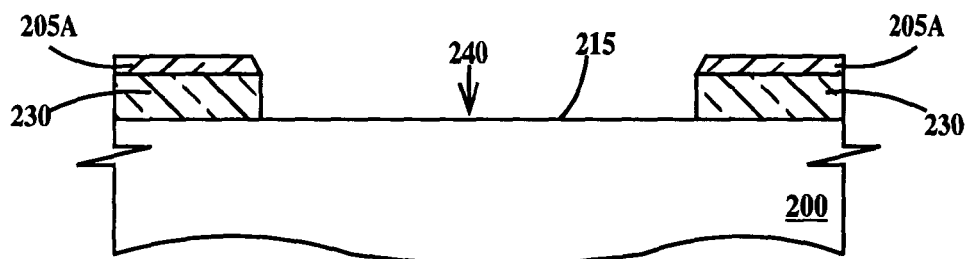
Figure 5E:
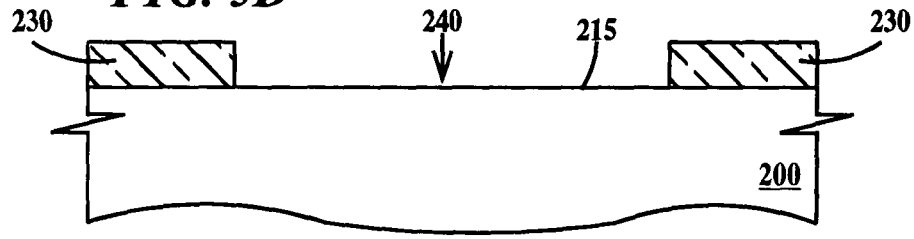

In FIG. 5D, trench 240 is etched into hardmask layer 225 wherever the substrate is not protected by thinned cured polyimide resin layer 205A. In FIG. 5E, thinned cured polyimide resin layer 205A (see FIG. 5D) is removed. Hardmask layer 230 may be used to etch substrate 200 or to block diffusion and ion implantation or as a mandrel for deposition of other coatings including conformal coatings.

The methodologies illustrated in FIGS. 3A through 3D, 4A through 4E and 5A through 5E may advantageously be applied to fabrication of integrated circuits and other semiconductor devices. Using these methods, features having a minimum dimension of less than about 40 nm may be formed.

Turning to the composition of cured polyimide resin layer 130B of FIGS. 1A through 1C, cured polyimide resin layer 150 of FIG. 2 and cured polyimide resin layer 205 of FIGS. 3A through 3C, FIGS. 4A and 4B and FIGS. 5A and 5B, there are three general formulations of uncured polyimide resins. It should be understood that for the purposes of the present invention curing an oligomer implies cross-linking the oligomer to form a polymer or cross-linked polymer or resin.

The polyimide medium or imaging layer of the embodiments of the present invention advantageously meets certain criteria. These criteria include high thermal stability to withstand millions of write and erase events, low wear properties (low pickup of material by tips), low abrasion (tips do not wear out), low viscosity for writing, glassy character with no secondary relaxations for long data bit lifetime, and shape memory for erasability.

Thermal and oxidative stability was imparted to cured polyimide resins by incorporating a large aromatic content in the polymer backbone and by ladder type linkages such as imide functionalities. Cured polyimide resins according to embodiments of the present invention have high temperature stability while maintaining a low glass transition temperature ($T_g$), which is contrary to current teaching that high temperature stability results in a high $T_g$ and vice versa. In one example, cured polyimide resins according to embodiments of the present invention are thermally and oxidatively stable to at least 400° C.

Wear and erasability of the media were improved by cross-linking the polyimide oligomers without increasing the $T_g$ which was unexpected. By placing the cross-linking sites at the chain ends, the molecular weight of polyimide oligomers is predefined and therefore cross-linking was found to have a lesser effect upon the glass transition temperature than is currently thought. The width of the transition from the rubbery to glassy state of the cured polyimide resin was found not to increase significantly over that of the polyimide oligomer. The sharp and practically temperature-invariant transition from the glassy to rubbery state as seen in polyimide oligomers was maintained in the cross-linked resin. Again, this is contrary to what is currently tought. The molecular weights of the polyimide oligomers themselves are controlled by the ratio of anhydride, amine and reactive end group precursor used in the polyimide oligomer synthesis.

Further control over the cross-link density was achieved by adding controlled amounts of reactant diluents described infra that enhance cross-linking. These reactive diluents formed a high density of cross-links that enhanced the wear properties of the polyimide medium without greatly increasing the $T_g$ or width of the glass transition.

The glass transition temperature was adjusted for good write performance. To optimize the efficiency of the write process there should be a sharp transition from the glassy state to the rubbery state. A sharp transition allows the cured resin to flow easily when a hot tip is brought into contact and quickly return to the glassy state once the hot tip is removed. However, too high a $T_g$ leads to high write currents and damage to the probe tip assemblies described supra. Incorporation of flexible aryl ether and thioether linkages resulted in polyimide resins of lower than expected $T_g$. In one example, cured polyimide resins of the embodiments of the present invention have $T_g$s of less than about 250° C., preferably between about 120° C. and about 250° C., more preferably between about 120° C. and 150° C.

Long data bit lifetime of the polyimide resin medium was obtained by the incorporation of hetero-atoms such as oxygen and sulfur in the polyimide resin backbone and varying the catenation of aromatic rings from para to meta linkages.

A first formulation of uncured polyimide resin comprises polyimide oligomers having the structure:

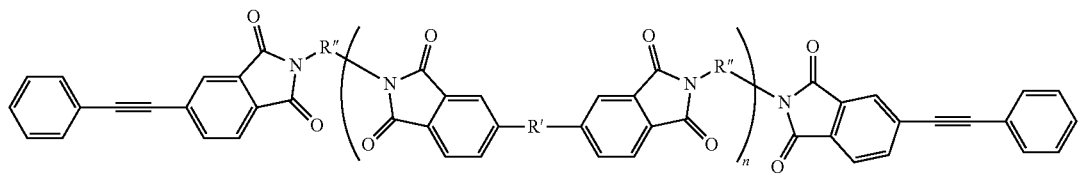
(I)

wherein R' is selected from the group consisting of

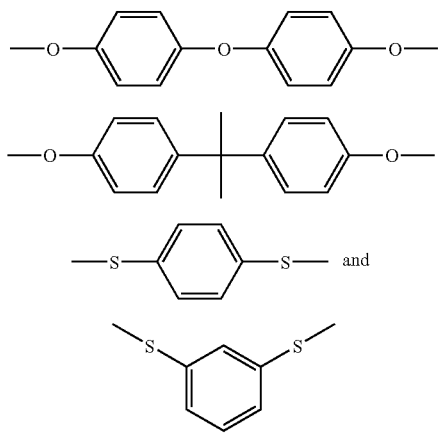

(II)
(III)
(IV)
(V)

and wherein R" is selected from the group consisting of

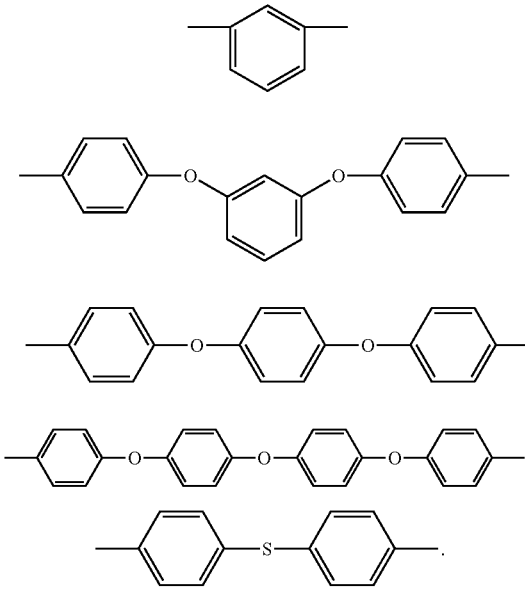

(VI)
(VII)
(VIII)
(IX)
(X)

The endgroups, having the structure:

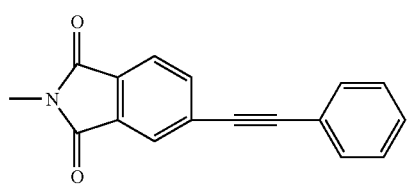

(XI)

provide the cross-linking of the polyimide oligomers into a polyimide resin. The reactive end group is the phenylethynyl group of structure (XI). In one example, curing is performed at about 300° C. to about 350° C.

In a second formulation of uncured polyimide resin, one or more of the following reactive diluents (including combinations of different structures (XII)) is added to the first formulation:

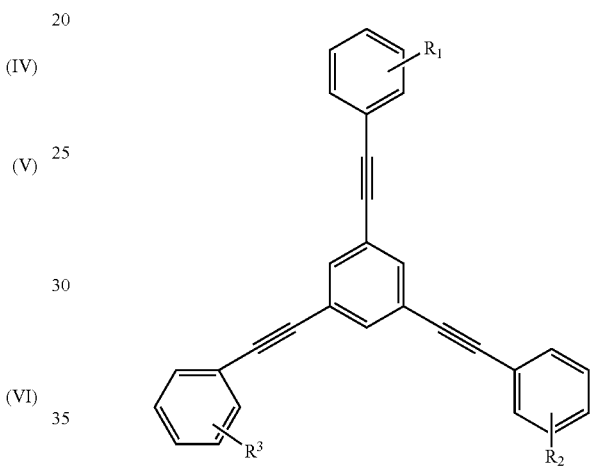

(XII)

where $R_1$, $R_2$ and $R_3$ are each independently selected from the group consisting of hydrogen, alkyl groups, aryl groups, cycloalkyl groups, alkoxy groups, aryloxy groups, alkylamino groups, arylamino groups, alkylarylamino groups, arylthio, alkylthio groups and

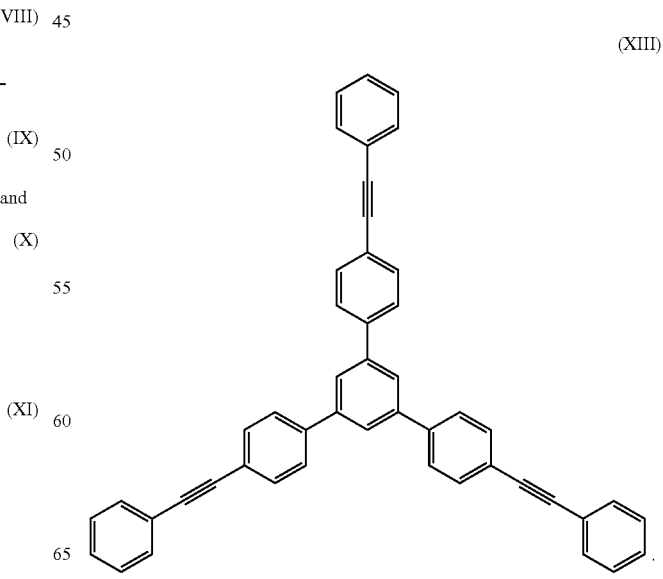

(XIII)

It should be noted that reactive diluents XII and XIII contain three substituted phenylethynyl groups. The phenylethynyl groups of the polyimide oligomers and the phenylethynyl groups reactive diluents provide the cross-linking of the polyimide oligomers into a polyimide resin. In one example, curing is performed at about 300° C. to about 350° C.

In one example, a Tg of a cured polyimide resin layer formed using the second formulation of the present invention with a reactive diluent is within about 50° C. of a Tg of an otherwise identical cured polyimide resin layer formed without the reactive diluent.

Figure 6:
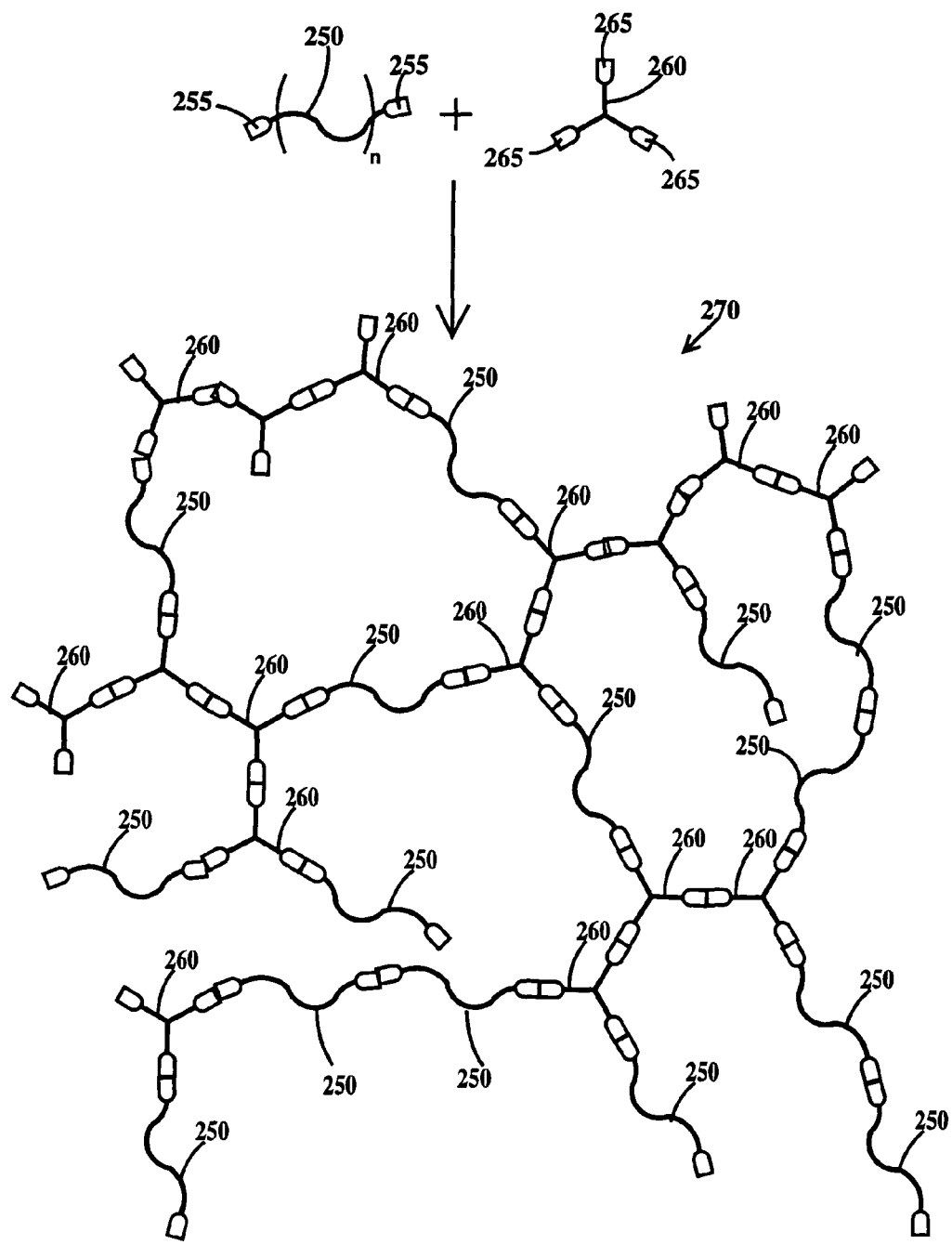
FIG. 6 is a diagram illustrating cross-linking of a polyimide resin with a reactive diluent according to embodiments of the present invention.

FIG. 6 is a diagram illustrating cross-linking of a polyimide resin with a reactive diluent according to embodiments of the present invention. In FIG. 6, a mixture of straight chain polyimide oligomer 250 of repeating units n and having two reactive endgroups 255 (which represents structure (I)) a reactive diluent 260 having three reactive functionalities 265 (representing structures (XII and XIII) is heat cured to produce a cross-linked polyimide resin 270. In resin 270, polyimide oligomers 250 are linked to each other through respective reactive endgroups; polyimide oligomers 250 are linked to reactive diluents 260 through respective reactive endgroups and reactive diluents 260 and linked to each other through respective reactive endgroups. Although Tg is usually a function of molecular weight and cross-link density, in this case it is largely independent of the percentage by weight of reactive diluent in the polyimide oligomer/reactive diluent mixture.

A third formulation of uncured polyimide resin comprises polyimide oligomers having the structure:

wherein R' is selected from the group consisting of

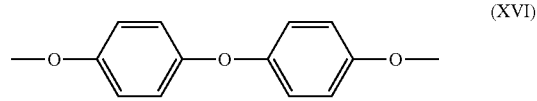

(XVI)

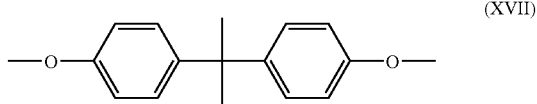

(XVII)

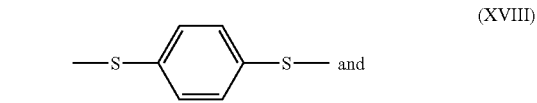

(XVIII)

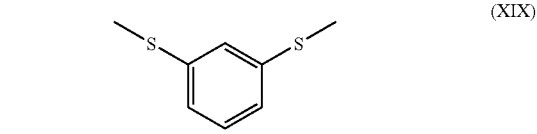

(XIX)

and wherein R" is selected from the group consisting of

(XX)

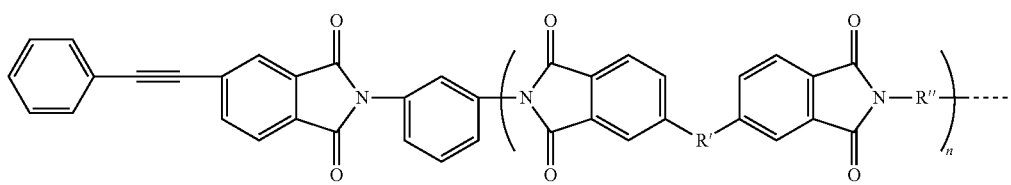

(XV)

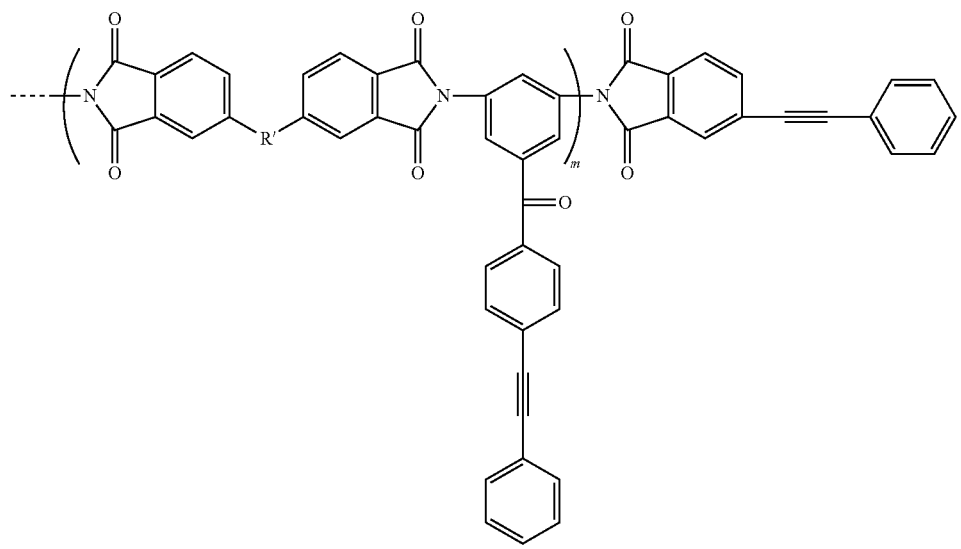

-continued

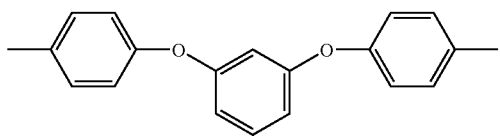
(XXI)

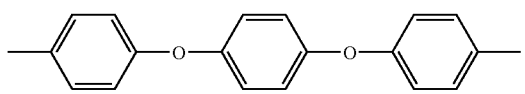
(XXII)

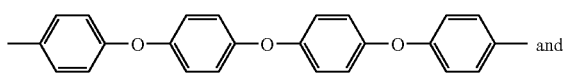
(XXIII)
and

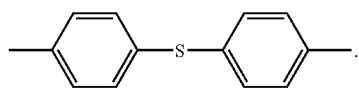
(XXIV)

Experimental

All materials were purchased from Aldrich and used without further purification unless otherwise noted.

Preparation of Thioether Dianhydride Oligomers (mTEDA and pTEDA)

Either 1,3-benzenedithiol or 1,4-benzenedithiol was dissolved in DMSO (20% solids) with triethylamine and 4-fluorophthalic anhydride. The mixture was heated to 60° C. for 4 hours and then either the mTEDA or pTEDA were precipitated on ice, filtered, and re-crystallized twice from DMSO/acetic anhydride.

Preparation of Phenylene Ether Dianhydride Oligomers

A bisphenol (e.g. 4-hydroxyphenyl ether) was dissolved in dry DMF with 4-nitrophthalonitrile and potassium carbonate. The solution was heated to 120° C. and the water generated was removed by azeotropic distillation with toluene. After 24 hours, the solids were precipitated on ice. The resulting solid was collected by vacuum filtration. The solid was then refluxed in toluene, ethanol, and hydrochloric acid to hydrolyze the nitrile groups to carboxylic acids. The mixture was again poured over ice and the resulting solid collected by vacuum filtration. The tetraacid was then dissolved in toluene and acetic anhydride, and heated to reflux for 8 hours. The resulting precipitate was collected by vacuum filtration and re-crystallized from acetic anhydride.

Preparation of Diamines

A bisphenol was dissolved in dry DMF with 4-fluoronitrobenzene, and potassium carbonate. The same procedure was followed as above for the nucleophilic aromatic substitution. The resulting solid was dissolved in THF and NaBH$_4$ was added slowly. The reaction was allowed to stir overnight and the product was collected by removal of the solvent under vacuum, and then extracted with CH$_2$Cl$_2$ and water. The organic phase was collected and the solvent removed under vacuum. The resulting solid was purified by vacuum sublimation.

Preparation of Bishydroxyphenylethers

The reagent 3-bromophenol was reacted with benzylbromide in the presence of potassium carbonate and 18-crown-6 in THF for 24 h. The reaction mixture was filtered to remove excess potassium carbonate and resultant potassium bromide, and the solvent was removed under vacuum. The remaining liquid was filtered through silica to give 3-bromophenylbenzylether in 92% yield. This product was then dissolved in dry NMP together with resorcinol, copper iodide, cesium carbonate, and tetramethylheptanedione. The mixture was stirred vigorously and heated at 120° C. for 72 hours. The solution was then precipitated by pouring over ice and extracted with methylene chloride. The organic phase was collected and the solvent removed. The resulting oil was dissolved in toluene and concentrated hydrochloric acid and heated to reflux.

Polyimide Oligomer Synthesis from Amic Acid

In a dry atmosphere, the oligomers, a diamine, and acetic anhydride were dissolved in dry cyclohexanone (20% solids) and allowed to stir for 24 hours. The poly(amic acid) formed was used to cast films from cyclohexanone. NMR spectra of the amic acids were acquired by removal of the solvent under vacuum and the addition of dry DMSO-d$_8$.

Polyimde Oligomer Synthesis by Chemical Imidization

Under an inert atmosphere, a bisanhydride and a diamine (purified by vacuum sublimation) were dissolved in dry NMP and allowed to stir for 24 hours. Acetic anhydride and triethylamine were then added and the reaction was allowed to stir under inert atmosphere for 48 hours. Finally the mixture was heated to 60° C. for 2 hours and then precipitated by pouring into stirring methanol. The resulting solid was washed on the frit with water, and methanol, and re-precipitated twice from cyclohexanone (or NMP).

Film Preparation from Polyimide

The polymer was dissolved in cyclohexanone (5% by weight) and filtered through a 0.2-micrometer filter onto UV/ozone cleaned silicone wafers. The wafer was then spun at 2500 rpm for 30 seconds yielding an approximately 100 nm thick film. The films were cross-linked on a hotplate under an inert atmosphere with a heating program of a 1-hour ramp from 50° C. to 350° C. and held an additional hour at 350° C. Bulk films and samples containing reactive diluent structure (XIII) were prepared in a similar fashion except for bulk films where a 20 weight % solution was used.

Film Preparation from Amic Acid

Under dry atmosphere, the polyamic acid precursors were diluted with cyclohexanone to the appropriate concentration (5% solids). Minimizing the exposure to ambient air, films of the precursor were spun at 2500 rpm for 30 seconds and then cured with a heating program of a 1-hour ramp from 50° C. to 350° C. and held an additional hour at 350° C.

In a first synthesis example, polyimide resins of varying molecular weights were synthesized by varying the ratios of the two oligomers 1,3-bis(4-aminophenoxy)benzene (XXVI) and 4,4'(4,4'-isopropylidenediphenoxy)bis(phthalic anhydride) (XXV) and the end capping agent 4-phenylethynylpthalic anhydride (XXVII). Bulk samples and thin films of these materials were prepared and then cured at 350° C. for one hour to yield highly cross-linked films.

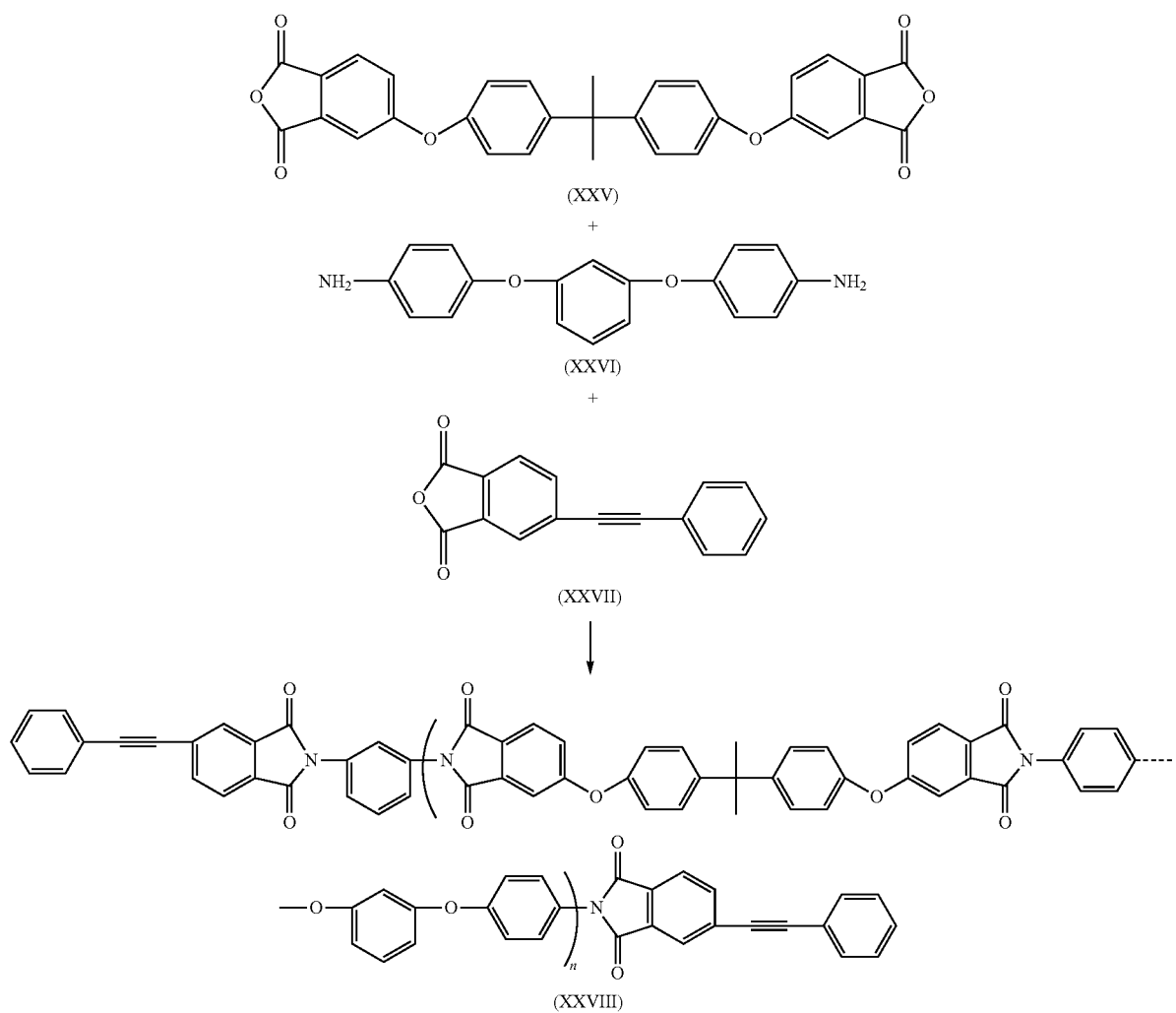
(XXV)
+
(XXVI)
+
(XXVII)
↓
(XXVIII)
One preparation (Sample A) of structure (XXVIII) was extensively studied. Cured sample A had a <Mn> 14,400 g/mol, Mw/Mn=1.9 and when cured at 350° C. had a Tg of about 175° C.
In a second synthesis example:
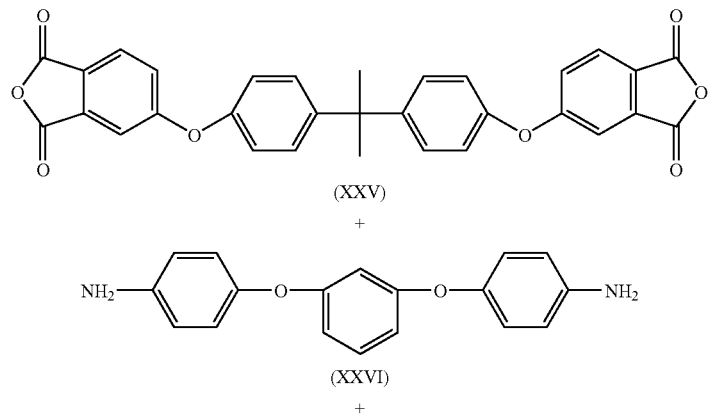
(XXV)
+
(XXVI)
+

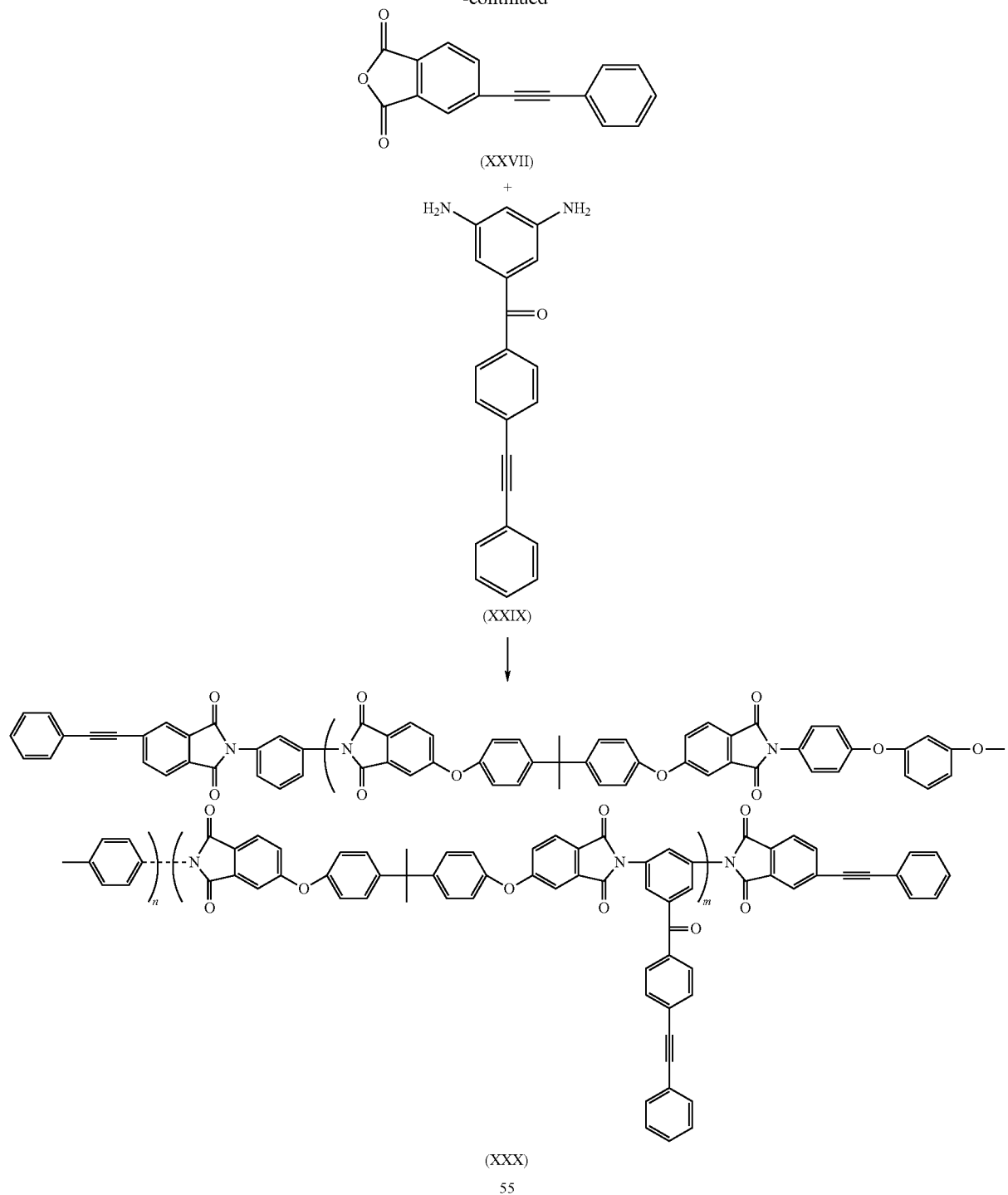

Other Syntheses

In order to reduce the glass transition temperature, the rigidity of the polymer backbone must be decreased. To that end, polyimide oligomers with an increased number of flexible aryl ether linkages as well as thioether linkages were synthesized.

Dianhydride phenylene ether containing oligomers were synthesized from the reaction of 4-nitrophthalonitrile with the requisite bisphenol precursor followed by hydrolysis of the cyano groups and dehydration to form the cyclic anhydride. The thioether variants were synthesized directly in one step from the reaction of a bisthiophenol with 4-fluorophthalic anhydride. This synthetic scheme allowed a series of ether- and thioether-containing oligomers with two or more ether or thioether linkages and all possible combinations of meta and para catenation. Furthermore the scheme was easily adapted to synthesize a number of phenylene ethers containing diamines with the same variation on number of ether linkages and catenation schemes by reaction of a bisphenol derivative with 4-fluoronitrobenzene and subsequent reduction of the nitro group to an amine.

The thioether dianhydrides were reacted with a series of diamines and 4-phenylethynylphthalic anhydride in specific ratios to yield polyimide oligomers with molecular weights ranging from $4\times10^3$ g/mol to $10\times10^3$ g/mol. The first step in the polymerization mechanism is the reaction of one diamine with one anhydride to form an amic acid. One of two steps can be taken at this point. For polymers where the fully imidized form exhibited good solubility and good film forming properties with cyclohexanone as the solvent, the polymer was imidized by a chemical dehydration with triethyl amine and acetic anhydride, and then isolated and characterized. With certain polymer compositions, the fully imidized material was difficult to process. To circumvent these issues with solubility and film forming properties, these polymers were processed into thin films from the amic acid. The polymers were then imidized thermally as thin films concurrently with the final cross-linking reaction. The amic acid precursors were analyzed by removal of the solvent under vacuum and transferred to dry sample containers with dried and distilled solvents for analysis by GPC and $^1$H-NMR. The thermal and mechanical properties of cured films were studied by TGA, DSC, and DMA.

Example of synthesis and structures of thioether containing dianhydride oligomers:

TABLE I

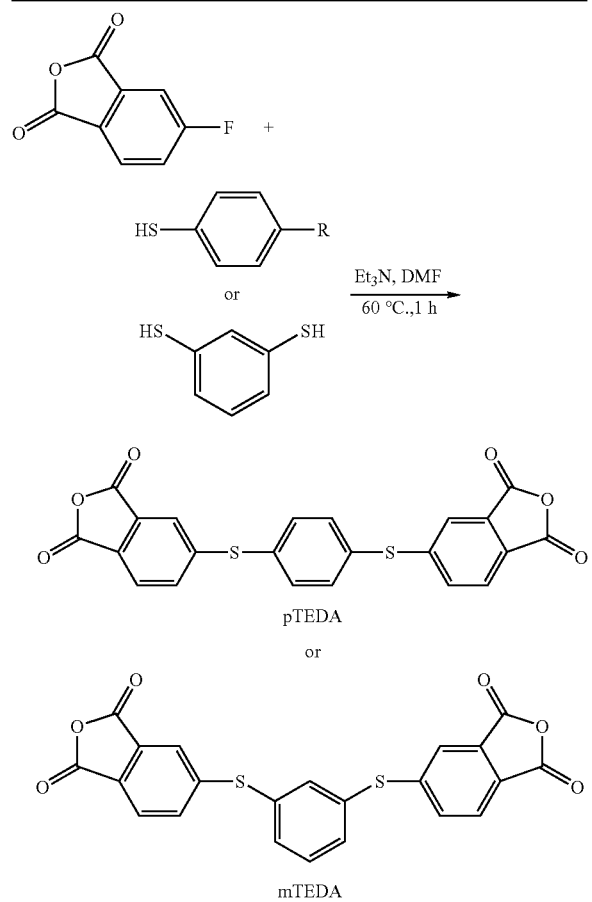

Properties of thioether based polyimides

| Dianhydride | Diamine | $<M_n>\times 10^{-3}$ g/mol | $T_g$ before cure °C. | $T_g$ cured °C. |
|---|---|---|---|---|
| pTEDA | APTE | 4.0 | $T_m$ 261(a) | 162 |
| mTEDA | APTE | 4.0 | 163 | 178 |
| mTEDA | mAPB | 7.0 | (b) | (b) |

TABLE I-continued

| | | | | |
|---|---|---|---|---|
| mTEDA | mAPB | 7.0 | (c) | 209 Processed from amic acid |
| mTEDA | mAPB | 14.0 | (c) | 151 Processed from amic acid | where

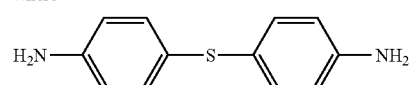

APTE

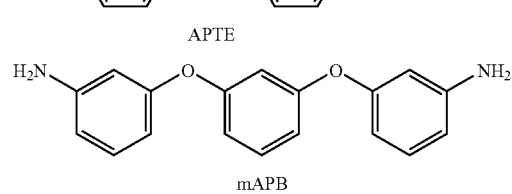

mAPB (a) $T_m$ indicates the temperature at which the sample melted.

(b) Semicrystalline, Tg not available.

(c) In processing from amic acid, cross-linking occurs concurrently with the conversion of the acid to the polyimide. Therefore there's no opportunity to measure Tg previous to cross-linking.

Example synthesis of bis-4,4'-isophthaloyloxyphenylene ether.

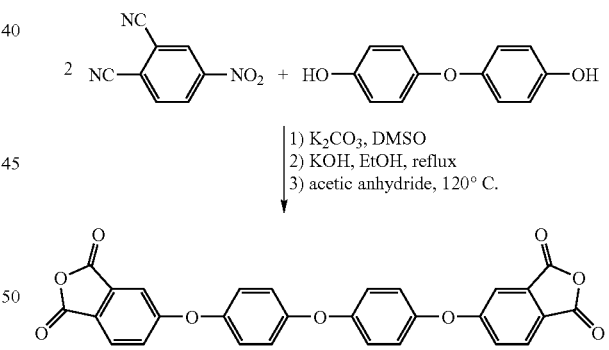

The phenylene ether materials exhibited similar solubility limitations as the thioether based materials. However, when all linkages in the diamine and the dianhydride were meta catenated, materials showed much improved solubility in solvents such as THF and cyclohexanone. These materials could be processed either from the amic acid or fully imidized states. Exclusively para catenated materials also exhibited semi-crystalline properties. However, once cured, the films were no longer crystalline due to the cross-links preventing crystallization of the chains. Working from the amic acid precursors avoided all solubility issues associated with the para-arylene ether polymers.

TABLE 2

| | | Phenylene ether based polyimides, imidized chemically | | |
|---|---|---|---|---|
| % II | % III | $<M_n> \times 10^{-3}$ g/mol | $T_g$ before cure ° C. | $T_g$ cured ° C. |
| 100 | 0 | 10.0 | $T_m$ 261 | 162 |
| 50 | 50 | 10.0 | 163 | 178 | where

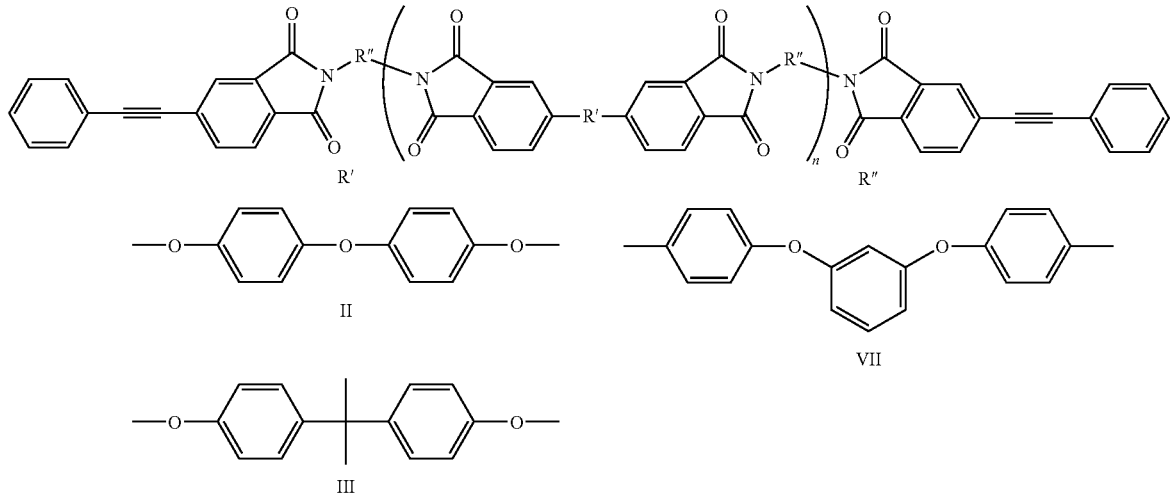

Figure 7:
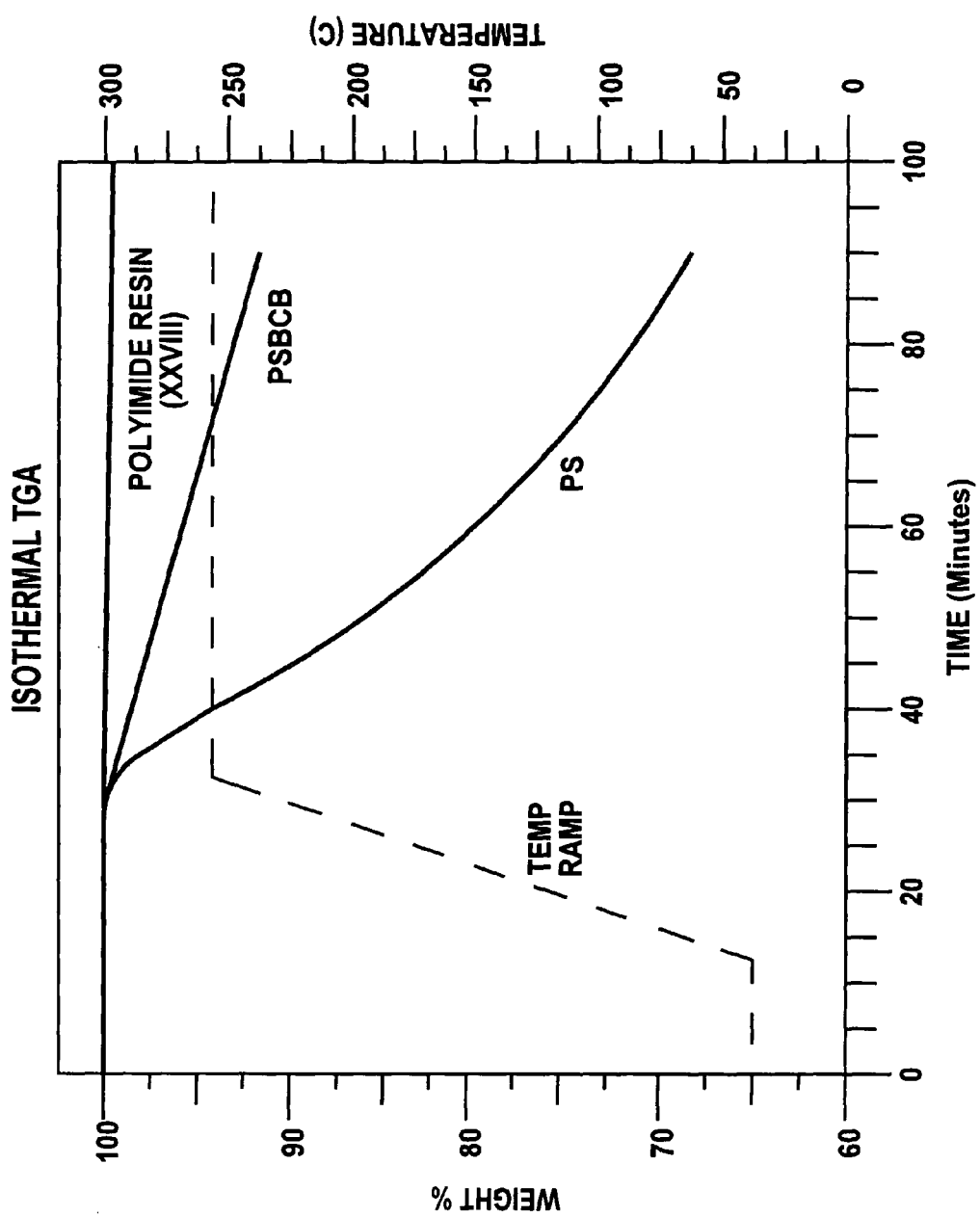
FIG. 7 is thermo-gravimetric analysis plotting percentage of weight remaining and temperature versus time of a polyimide resin according to an embodiment of the present invention compared to polystyrene resins.

FIG. 7 is thermo-gravimetric analysis (TGA) plotting percentage of weight remaining and temperature versus time of a polyimide resin according to an embodiment of the present invention compared to polystyrene resins. The primary limiting factor in the use of polystyrene (PS) or of polystyrene-co-vinylbenzocyclobutene (PSBCB) for a storage medium was poor thermal stability. The results of a TGA study showed that polyimides resins outperformed PS and PSBCB resins. The styrenic material began to decompose rapidly once the furnace reached 250° C. while the polyimide resin showed no appreciable degradation until above 350° C. in scanning TGA and no weight loss over hours at 250° C. in isothermal TGA. The polyimide resin used in this TGA study was XXVIII.

Figure 8:
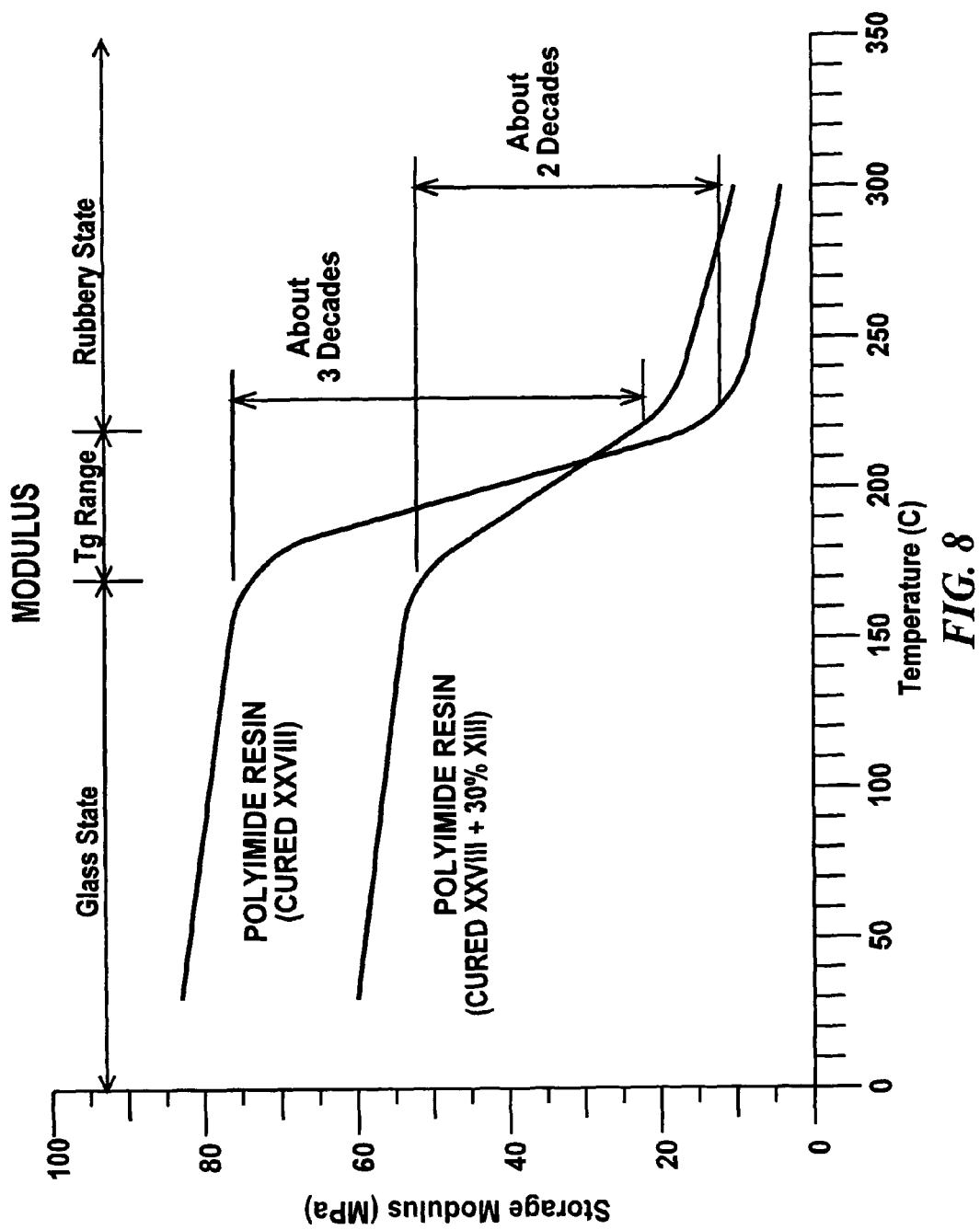
FIG. 8 is a plot of modulus versus temperature of polyimide resins according to embodiments of the present invention.

FIG. 8 is a plot of modulus versus temperature polyimide resins according to embodiments of the present invention. FIG. 8 plots the storage modulus versus temperature for cured sample A and for a polyimide resin made by curing sample A with 30% by weight reactive diluent structure (XIII). Cured sample A exhibited a change in modulus of about 3 decades transitioning from the glassy state to the rubbery state. Cured sample A and 30% by weight reactive diluent structure (XIII) exhibited a drop in modulus of about 2 decades transitioning from the glassy state to the rubbery state. The Tg range for both samples was about the same with a Tg of about 175° C. In general a polyimide resin layer according to embodiments of the present invention had a modulus above a glass transition temperature between about 1.5 and about 3.0 decades lower than a modulus of the polyimide resin layer below the glass transition temperature of the polyimide resin layer.

Figure 9A:
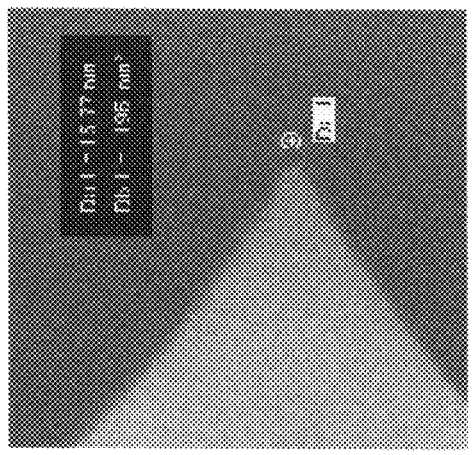
FIGS. 9A through 9D are SEM photomicrographs of tips of various tip assemblies.
Figure 9C:
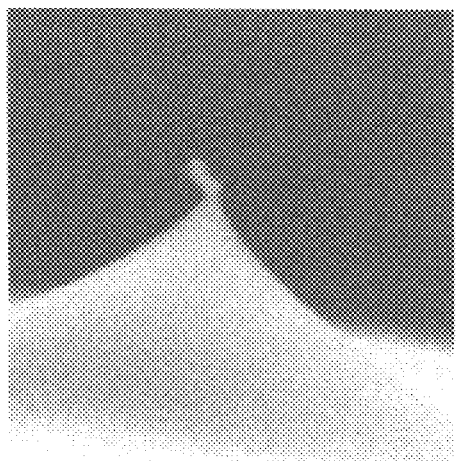
Figure 9B:
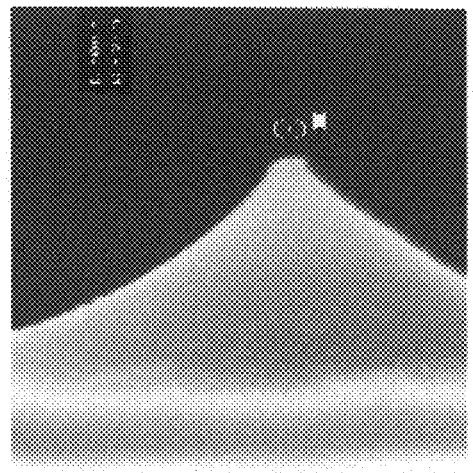
Figure 9D:
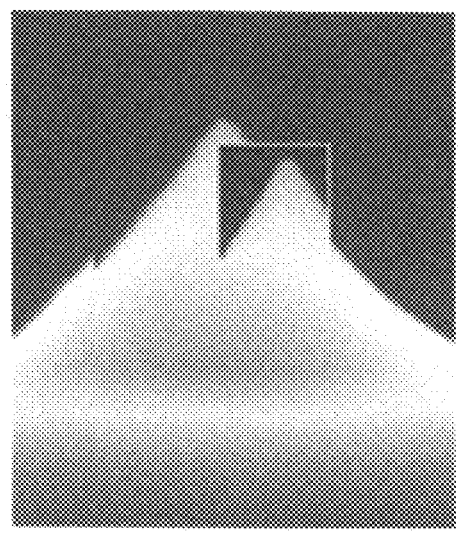

FIGS. 9A through 9D are SEM photomicrographs of tips of various tip assemblies. FIG. 9A is an SEM photomicrograph of an unused tip 120 (see FIG. 1A). FIG. 9B is an SEM photomicrograph of a worn tip 120 after use on a polystyrene layer. FIG. 9C is an SEM photomicrograph of a worn tip 120 after use on a PSBCB layer showing pickup of the storage medium. FIG. 9D is an SEM photomicrograph of tip 120 after about 2.4E6 write/erase and about 2.3E8 read cycles of a polyimide resin medium according to embodiments of the present invention. As can be seen there is virtually no tip wear.

Figure 10:
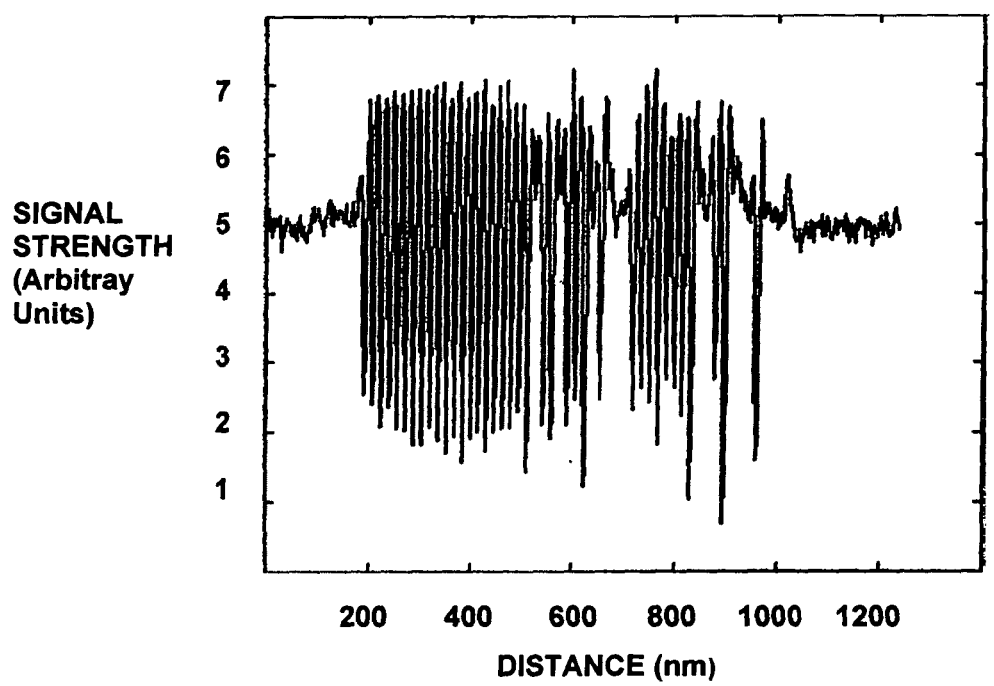
FIG. 10 is an AFM scan-line cross-section showing data bits written in a storage medium according to an embodiment of the present invention.

FIG. 10 is an AFM scan-line cross-section showing data bits written in a storage medium according to an embodiment of the present invention. In FIG. 10 a pattern of data bits (indentation for a "1", no indentation for a "0") were written and the definition of the data determined using an AFM. Each "1" bit generated a very sharp and distinct signal, while the noise generated by "0" bits was very low. The write pitch was 34 nm which is greater than 500 Gb/inch².

Thus, the embodiments of the present invention provide data storage and imaging methodologies that operate in the nanometer regime.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
    (a) pushing a probe, heated to at least 100° C., into a cross-linked resin layer formed by curing a layer of polyimide oligomers;
    (b) removing said probe from said resin layer, resulting in formation of a deformed region in said cross-linked resin layer;
    repeating (a) and (b) multiple times to form multiple deformed regions, each deformed region of said multiple deformed regions formed in a different region of said cross-linked resin layer, said multiple deformed regions representing information stored in said cross-linked resin layer; and wherein said polyimide oligomers have the structure:

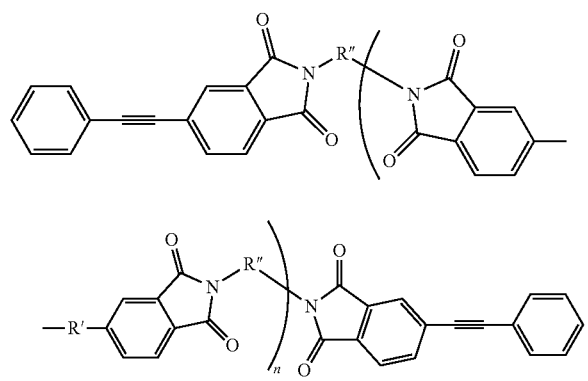

wherein R' is selected from the group consisting of:

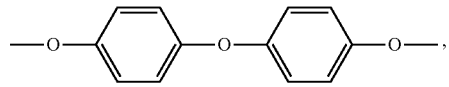

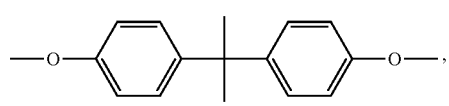

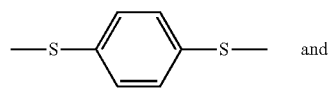 and

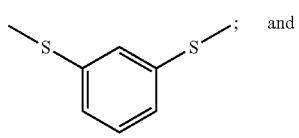 ; and wherein R" is selected from the group consisting of

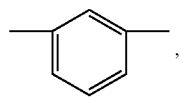 ,

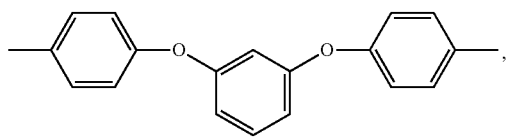 ,

 ,

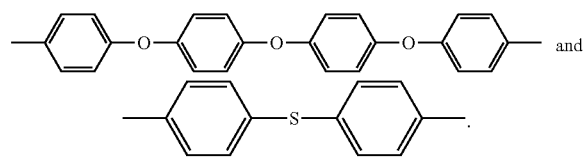 and

.

2. The method of claim 1, wherein said layer of polyimide oligomers includes a reactive diluent, said reactive diluent selected from the group consisting of:

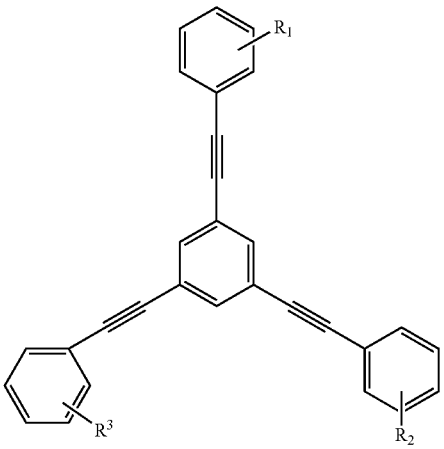

where $R_1$, $R_2$ and $R_3$ are each independently selected from the group consisting of hydrogen, alkyl groups, aryl groups, cycloalkyl groups, alkoxy groups, aryloxy groups, alkylamino groups, arylamino groups, alkylarylamino groups, arylthio, alkylthio groups and

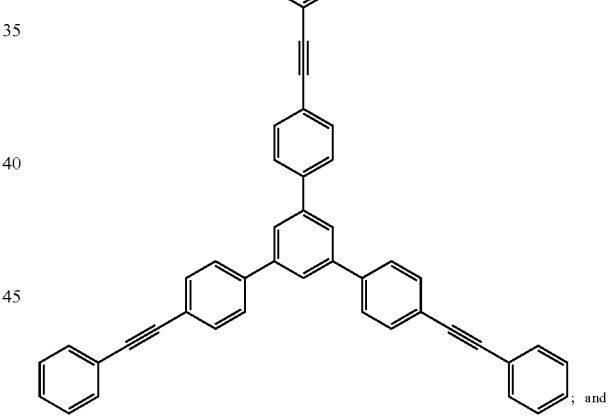 ; and wherein said polyimide oligomers are cross-linked by reactive diluent groups derived from said reactive diluent during said curing.

3. The method of claim 2, wherein a glass transition temperature of said cross-linked resin layer formed with said reactive diluent groups is within about 50° C. of a glass transition temperature of an otherwise identical cross-linked resin layer formed without said reactive diluent groups.

4. The method of claim 2, wherein after said curing, said cross-linked resin layer is cross-linked by reactive endgroups of said polyimide oligomers and by reactive groups of said reactive diluent.

5. The method of claim 1, wherein after said curing, said cross-linked resin layer is cross-linked by reactive endgroups of said polyimide oligomers.

6. The method of claim 1, wherein a glass transition temperature of said cross-linked resin layer is less than about 250° C.

7. The method of claim 1, wherein a modulus of said cross-linked resin layer above a glass transition temperature of said cross-linked resin layer is between about 1.5 and about 3.0 decades lower than a modulus of said cross-linked resin layer below said glass transition temperature of said cross-linked resin layer.

8. The method of claim 1, wherein said cross-linked resin layer is thermally and oxidatively stable to at least 400° C.

9. The method of claim 1, further including:
dragging said probe in a direction parallel to a top surface of said cross-linked resin layer while heating and pushing said probe, resulting in formation of a trough in said cross-linked resin layer.

10. The method of claim 1, wherein said cross-linked resin layer has a thickness between about 10 nm and about 500 nm and a thickness variation of less than about 1.0 nm across said cross-linked resin layer.

11. A method, comprising:
(a) pushing a probe, heated to at least 100° C., into a cross-linked resin layer formed by curing a layer of polyimide oligomers;
(b) removing said probe from said resin layer, resulting in formation of a deformed region in said cross-linked resin layer;
repeating (a) and (b) multiple times to form multiple deformed regions, each deformed region of said multiple deformed regions formed in a different region of said cross-linked resin layer, said multiple deformed regions representing information stored in said cross-linked resin layer; and
wherein said polyimide oligomers have the structure:

wherein R' is selected from the group consisting of

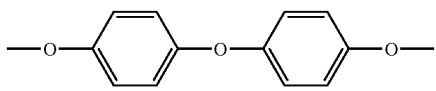

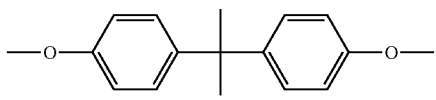

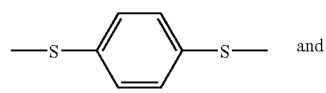 and

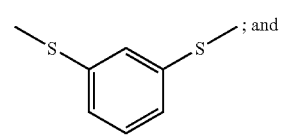 ; and wherein R" is selected from the group consisting of

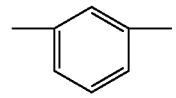

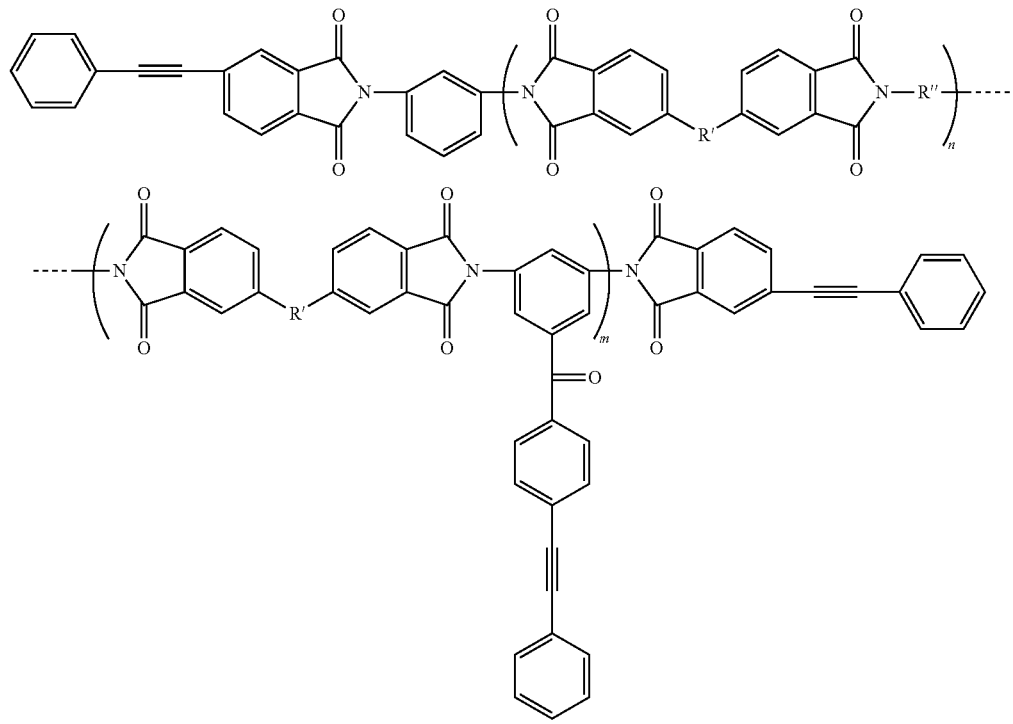

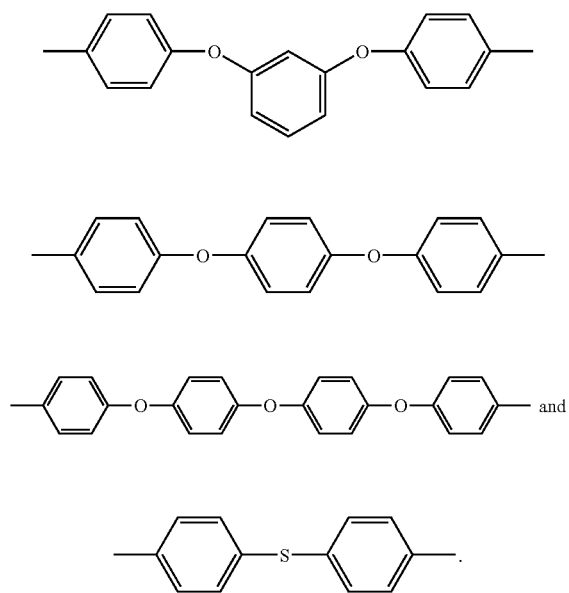

12. The method of claim 11, said layer polyimide oligomers further including reactive diluent groups, said polyimide oligomers cross-linked by said reactive diluent groups, said reactive diluent groups derived from reactive diluents selected from the group consisting of:

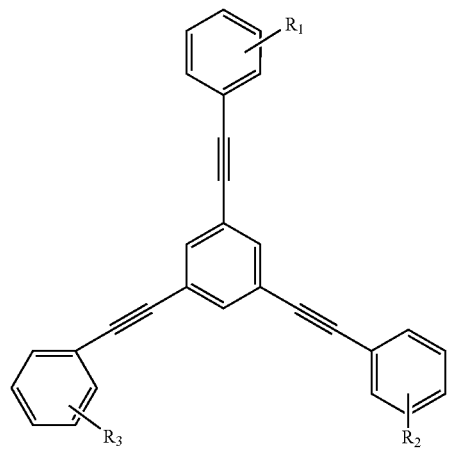

where $R_1$, $R_2$ and $R_3$ are each independently selected from the group consisting of hydrogen, alkyl groups, aryl groups, cycloalkyl groups, alkoxy groups, aryloxy groups, alkylamino groups, arylamino groups, alkylarylamino groups, arylthio, alkylthio groups and 13. The method of claim 12, wherein a glass transition temperature of said cross-linked resin layer formed with said reactive diluent groups is within about 50° C. of a glass transition temperature of an otherwise identical cross-linked resin layer formed without said reactive diluent.

14. The method of claim 12, wherein after said curing, said cross-linked resin layer is cross-linked by said reactive endgroups of said polyimide oligomers, by reactive pendent groups attached to a backbone of said polyimide oligomers and by reactive groups of said reactive diluent.

15. The method of claim 11, wherein said cross-linked resin layer is cross-linked by reactive endgroups of said polyimide oligomers.

16. The method of claim 11, wherein said cross-linked resin layer is cross-linked by reactive pendent groups attached to a backbone of said polyimide oligomers.

17. The method of claim 11, wherein a glass transition temperature of said cross-linked resin layer is between about 120° C. and about 250° C.

18. The method of claim 11, wherein a modulus of said cross-linked resin layer above a glass transition temperature of said resin layer is between about 1.5 and about 3.0 decades lower than a modulus of said resin layer below said glass transition temperature of said resin layer.

19. The method of claim 11, wherein said cross-linked resin layer has a thickness between about 10 nm and about 500 nm and a thickness variation of less than about 1.0 nm across a writeable region of said cross-linked resin layer.

20. The method of claim 11, wherein after said curing, said cross-linked resin layer is cross-linked by reactive endgroups of said polyimide oligomers and by reactive endgroups of said pendent groups of said polyimide oligomers.

21. The method of claim 11, wherein said cross-linked resin layer is thermally and oxidatively stable to at least 400° C.

* * * * *